US010235813B1

(12) United States Patent
Brockman et al.

(10) Patent No.: US 10,235,813 B1
(45) Date of Patent: Mar. 19, 2019

(54) METHOD FOR MODIFYING IMAGES OF VEHICLES, TIRES, AND LIFT KITS

(71) Applicant: THE REYNOLDS AND REYNOLDS COMPANY, Kettering, OH (US)

(72) Inventors: Robert Brockman, Houston, TX (US); Sidney Haider, Houston, TX (US)

(73) Assignee: THE REYNOLDS AND REYNOLDS COMPANY, Kettering, OH (US)

( * ) Notice: Subject to any disclaimer, the term of this patent is extended or adjusted under 35 U.S.C. 154(b) by 0 days.

(21) Appl. No.: 15/874,460

(22) Filed: Jan. 18, 2018

Related U.S. Application Data

(60) Provisional application No. 62/453,916, filed on Feb. 2, 2017.

(51) Int. Cl.

| | |
|---|---|
| ***G06T 19/00*** | (2011.01) |
| ***G06T 13/20*** | (2011.01) |
| ***G06F 3/0484*** | (2013.01) |
| ***G06T 19/20*** | (2011.01) |
| *G06Q 30/06* | (2012.01) |

(52) U.S. Cl.
CPC ........ *G06T 19/006* (2013.01); *G06F 3/04842* (2013.01); *G06F 3/04845* (2013.01); *G06T 13/20* (2013.01); *G06T 19/20* (2013.01); *G06Q 30/0633* (2013.01); *G06T 2200/24* (2013.01); *G06T 2219/2012* (2013.01)

(58) Field of Classification Search
CPC ....... G06T 19/006; G06T 19/20; G06T 13/20; G06F 3/04842; G06F 3/04845
See application file for complete search history.

(56) References Cited

U.S. PATENT DOCUMENTS

| | | | |
|---|---|---|---|
| 6,339,763 B1 * | 1/2002 | Divine | G06F 17/30244 345/634 |
| 7,015,792 B2 | 3/2006 | Lessard et al. | |
| 7,106,343 B1 * | 9/2006 | Hickman | G06T 11/40 345/589 |
| 7,936,946 B2 | 5/2011 | Bhatt et al. | |
| 8,566,714 B1 * | 10/2013 | Stringer | G06T 19/20 345/419 |
| 8,812,980 B2 | 8/2014 | Burt | |
| 9,911,243 B2 * | 3/2018 | Vats | G06T 19/20 |
| 9,928,544 B1 * | 3/2018 | Hasan | G06Q 30/0643 |
| 2002/0128933 A1 * | 9/2002 | Day | G06Q 30/06 705/26.35 |
| 2004/0113483 A1 | 6/2004 | Sylvester et al. | |
| 2008/0183593 A1 | 7/2008 | Dierks | |
| 2013/0262528 A1 | 10/2013 | Foit | |
| 2014/0282060 A1 | 9/2014 | Bhardwaj et al. | |
| 2015/0095113 A1 | 4/2015 | Richards-Boeff et al. | |
| 2015/0144693 A1 | 5/2015 | Li et al. | |
| 2015/0178809 A1 | 6/2015 | Scopazzi | |
| 2015/0225102 A1 | 8/2015 | Digiorgio et al. | |
| 2016/0098771 A1 | 4/2016 | Brockman et al. | |
| 2017/0098272 A1 | 4/2017 | Brockman et al. | |

* cited by examiner

*Primary Examiner* — King Poon
*Assistant Examiner* — Vincent Peren
(74) *Attorney, Agent, or Firm* — Adolph Locklar

(57) ABSTRACT

A method includes determining a specific or basic vehicle, retrieving a base image or modified base image corresponding to the specific or basic vehicle, and selecting an accessory. The method also includes retrieving an accessory image corresponding to the accessory and animating the accessory image onto the base image or modified base image.

17 Claims, 26 Drawing Sheets

Figure 5A:
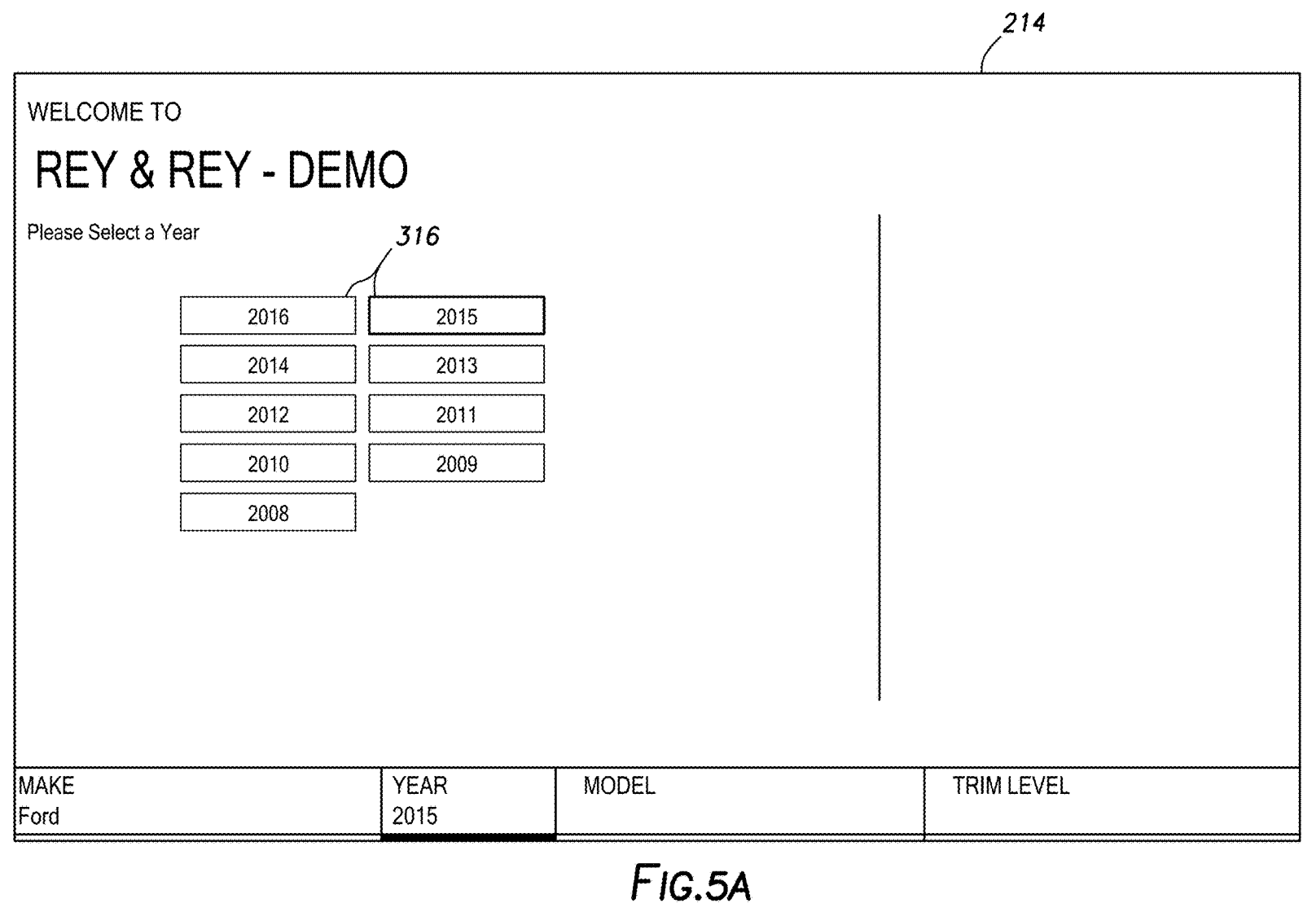

WELCOME TO

REY & REY - DEMO

Please Select a Year

316

2016 2015
2014 2013
2012 2011
2010 2009
2008

MAKE
Ford

YEAR
2015

MODEL

TRIM LEVEL

FIG.5A 222
2015 Ford F-150 Super Crew - XLT
Please Select Color Options
Exterior
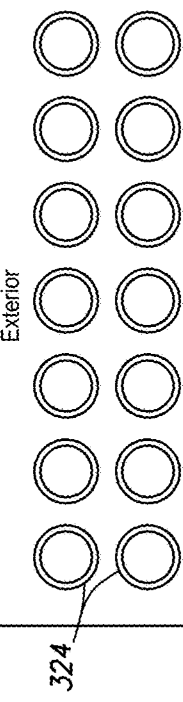
INTERIOR
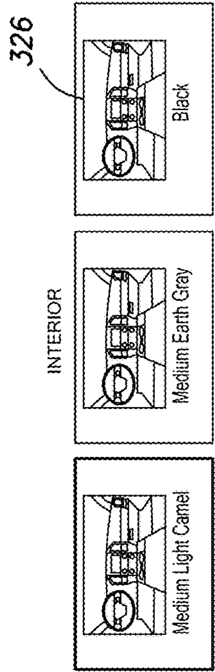
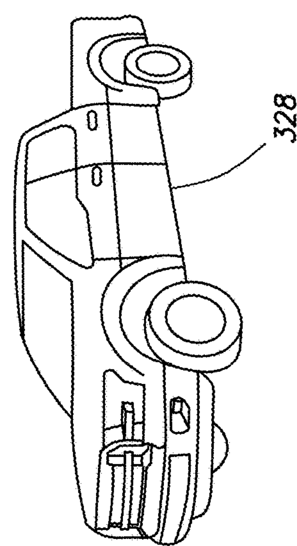
Ruby Red
326
330
Medium Light Camel
PAYMENT PRESENTATION
CASH PRESENTATION
| MAKE | YEAR | MODEL | TRIM LEVEL |
| --- | --- | --- | --- |
| Ford | 2015 | F-150 Super Crew | XLT |
FIG. 5D

FIG. 9

Figure 10:
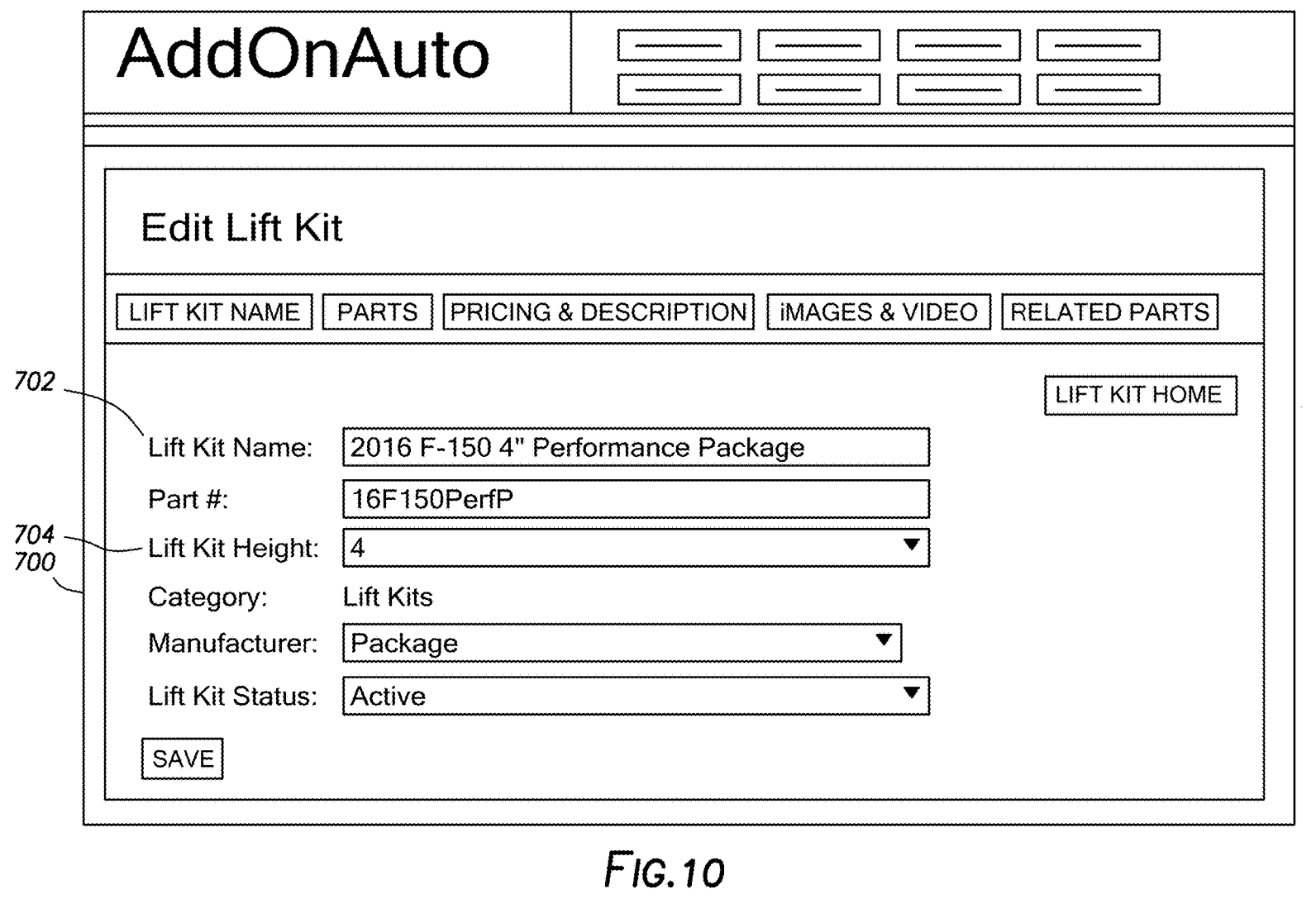

AddOnAuto

Edit Lift Kit

LIFT KIT NAME | PARTS | PRICING & DESCRIPTION | IMAGES & VIDEO | RELATED PARTS

LIFT KIT HOME

Lift Kit Name: 2016 F-150 4" Performance Package

Part #: 16F150PerfP

Lift Kit Height: 4

Category: Lift Kits

Manufacturer: Package

Lift Kit Status: Active

SAVE

Figure 11A:
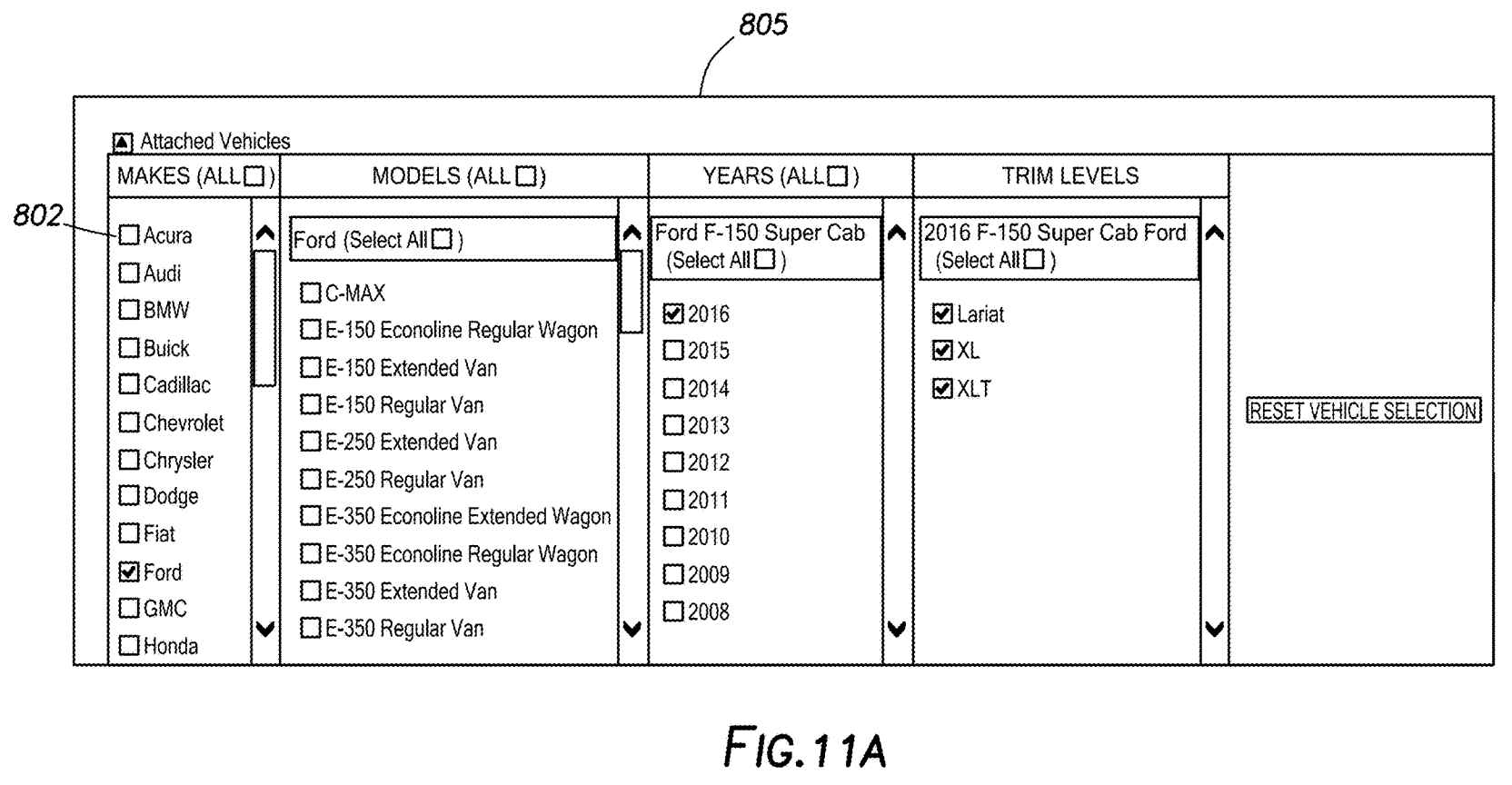

Attached Vehicles

MAKES (ALL☐)

☐ Acura
☐ Audi
☐ BMW
☐ Buick
☐ Cadillac
☐ Chevrolet
☐ Chrysler
☐ Dodge
☐ Fiat
☑ Ford
☐ GMC
☐ Honda

802

MODELS (ALL☐)

Ford (Select All☐)

☐ C-MAX
☐ E-150 Econoline Regular Wagon
☐ E-150 Extended Van
☐ E-150 Regular Van
☐ E-250 Extended Van
☐ E-250 Regular Van
☐ E-350 Econoline Extended Wagon
☐ E-350 Econoline Regular Wagon
☐ E-350 Extended Van
☐ E-350 Regular Van

YEARS (ALL☐)

Ford F-150 Super Cab (Select All☐)

☑ 2016
☐ 2015
☐ 2014
☐ 2013
☐ 2012
☐ 2011
☐ 2010
☐ 2009
☐ 2008

TRIM LEVELS

2016 F-150 Super Cab Ford (Select All☐)

☑ Lariat
☑ XL
☑ XLT

RESET VEHICLE SELECTION

Figure 11B:
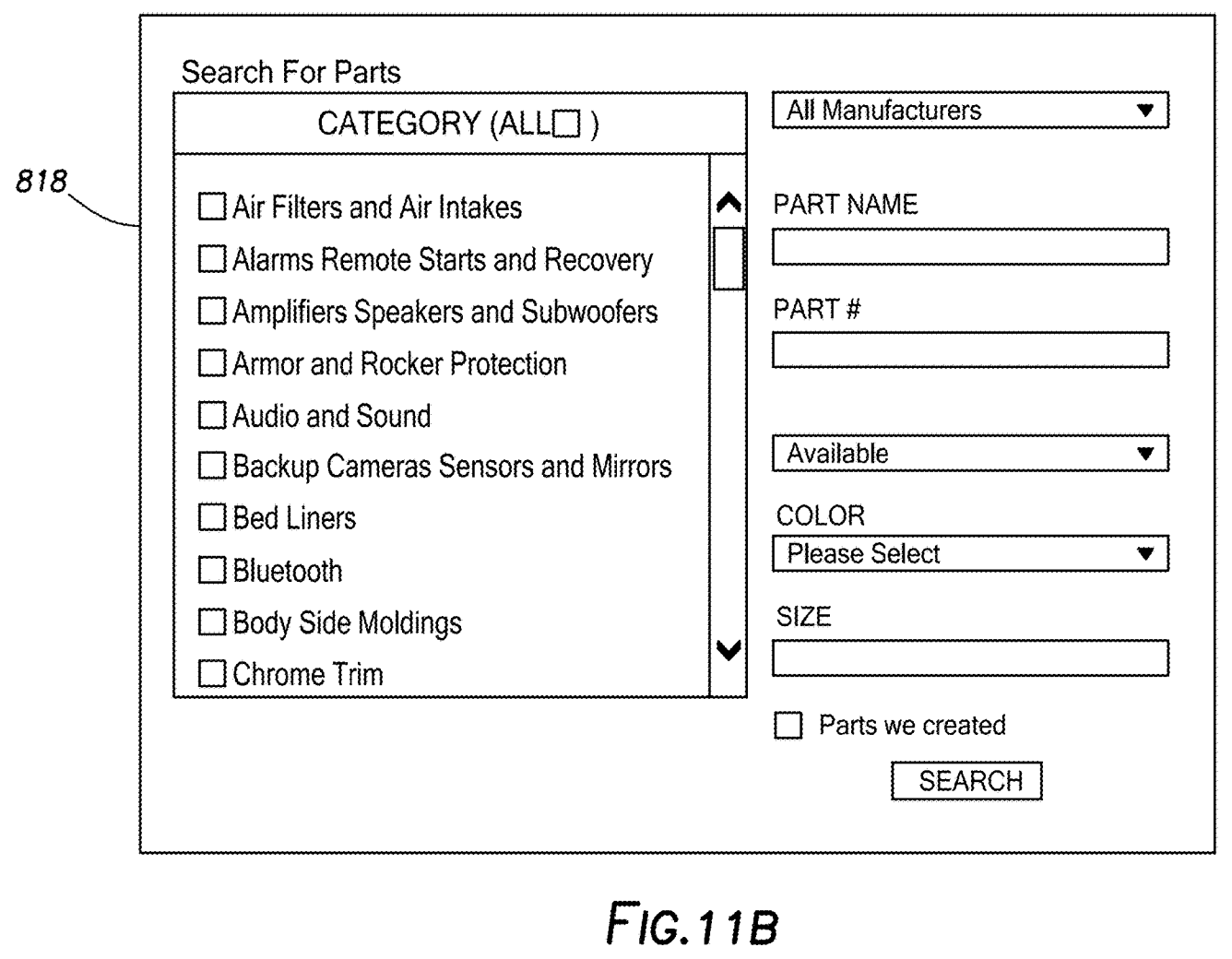

Search For Parts

CATEGORY (ALL☐ )

☐ Air Filters and Air Intakes
☐ Alarms Remote Starts and Recovery
☐ Amplifiers Speakers and Subwoofers
☐ Armor and Rocker Protection
☐ Audio and Sound
☐ Backup Cameras Sensors and Mirrors
☐ Bed Liners
☐ Bluetooth
☐ Body Side Moldings
☐ Chrome Trim All Manufacturers

PART NAME

PART #

Available

COLOR

Please Select

SIZE

☐ Parts we created

SEARCH

Edit Lift Kit

LIFT KIT NAME | PARTS | PRICING & DESCRIPTION | IMAGES & VIDEO | RELATED PARTS

LIFT KIT HOME

| LIFT KIT NAME | PART # | MANUFACTURER | HEIGHT | AVAIL | LIFT KIT PARTS |
|---|---|---|---|---|---|
| 2016 F-150 4" Performance Package | 16F150PerfP | Package | 4" | Y | View Parts |

SAVE

Selected Parts

| Default | Part Name | Part Number | Manufacturer | Category | Avail | Qty | Part Cost | Part Retail | Labor Hrs | Total Retail |
|---|---|---|---|---|---|---|---|---|---|---|

830

Pricing

Miscellaneous Options

FIG. 11C

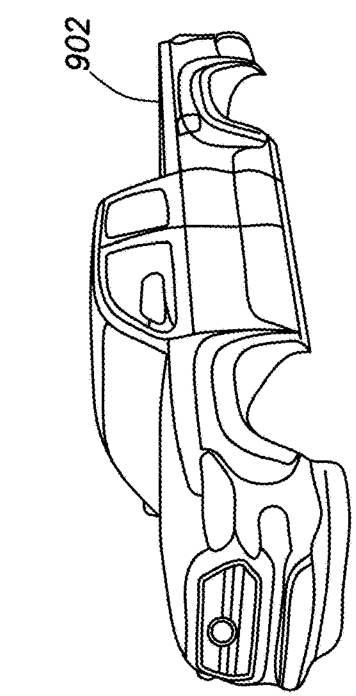
FIG. 13A
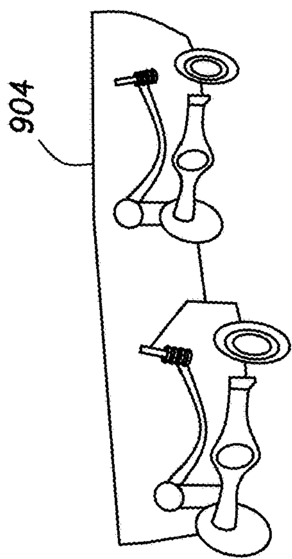
FIG. 13B
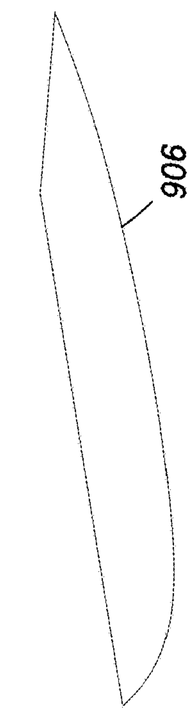
FIG. 13C
908
FIG. 13D
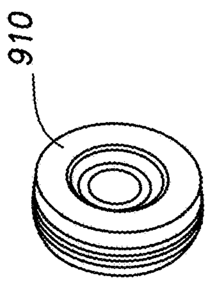
FIG. 13E

METHOD FOR MODIFYING IMAGES OF VEHICLES, TIRES, AND LIFT KITS

CROSS REFERENCE TO RELATED APPLICATIONS

This application is a nonprovisional application that claims priority from U.S. Provisional Application No. 62/453,916, filed Feb. 2, 2017, which is incorporated by reference in its entirety.

TECHNICAL FIELD/FIELD OF THE DISCLOSURE

The present disclosure relates generally to computerized methods for adding lift kits and tire accessories to vehicle images.

BACKGROUND OF THE DISCLOSURE

A customer for a vehicle may customize the vehicle by adding such accessories as different tires than those originally specified for the vehicle, or lift kits. Lift kits are an assembly of parts that when added to the vehicle, change the profile of the vehicle. A lift kit lifts or lowers the vehicle, traditionally both front and rear, typically from 1" to more than 4". Lift kits may come in three varieties: body lift kits, suspension lift kits, and suspension lowering kits.

Conventionally, a body lift kit uses blocks and spacers to lift the body higher onto the frame of the vehicle without altering the suspension geometry. With a body lift kit, the ground clearance often remains unchanged, but the extra height allows larger wheels and tires. The steering geometry conventionally remains unaltered, so the vehicle may retain most of its original driving and handling characteristics. Body lifts may be more affordable and easier to install than suspension lift kits.

Suspension lift kits often include replacement of shocks and/or struts, leaf springs, control arms, trailing arms, driveshaft and steering components. Replacing and upgrading these components allows for more suspension articulation, more ground clearance, and the ability to run larger tires.

Like suspension lift kits, suspension lowering kits may include replacement of shocks and/or struts, leaf springs, control arms, trailing arms, driveshaft and steering components. Replacing and upgrading these components allows for more suspension articulation, and lower ground clearance.

As used herein, tire and/or lift kit customization is referred to as "tire and lift kit accessories."

Retailers may desire a process for managing the process of vehicle customization so as to provide the customer with information regarding the tire and lift kit accessories and prices of the tire and lift kit accessories. Further, such a process may facilitate purchases of tire and lift kit accessories by those customers that might otherwise not occur had such a process not existed.

Traditional processes for presenting information regarding accessories and prices of the tire and lift kit accessories have been limited. With respect to tires, a retailer employee may show the customer a picture of the tire from a paper catalog, magazine, product guide, or digital image. With respect to lift kits, only a list of parts without images may be available to the retailer for presentation to a customer. In some traditional processes, tire and lift kit accessories may be shown on a vehicle other than that being purchased by the customer, traditionally on paper. For example, tire and lift kit accessories may be shown to customers from physical copies of catalogs, which may be in some cases out of date or not offered for particular models or years of vehicles. Traditional systems have limited, manual systems for determining whether the tire and lift kit accessories selected by the customer may be used or available for the vehicle the customer has selected, such as consulting a catalog. Also, in traditional methods, the customer is unable to view the tire and lift kit accessories on a vehicle that is the same or similar to the vehicle being purchased or considered for purchase by the customer.

SUMMARY

The present disclosure provides for a computerized method for adding lift kits or tires to vehicle images. The method includes providing a plurality of image layers and constructing a base image or modified base image from the plurality of image layers. The method also includes selecting a tire or lift kit accessory, and retrieving an accessory image corresponding to the tire or lift kit accessory. In addition, the method includes animating the accessory image onto the base image or modified base image.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 2 is a depiction of a deal summary consistent with at least one embodiment of the present disclosure.

FIG. 5A is depiction of a year selection GUI consistent with at least one embodiment of the present disclosure.

FIG. 5D is a depiction of a color selection GUI consistent with at least one embodiment of the present disclosure.

FIG. 9 is a depiction of configurator GUI consistent with at least one embodiment of the present disclosure.

FIG. 10 is a depiction lift kit editor GUI consistent with at least one embodiment of the present disclosure.

FIGS. 11A-11C are depictions of parts selection GUI consistent with at least one embodiment of the present disclosure.

FIGS. 13A-13E are image layers consistent with at least one embodiment of the present disclosure

DETAILED DESCRIPTION

Figures 1A, 1B:
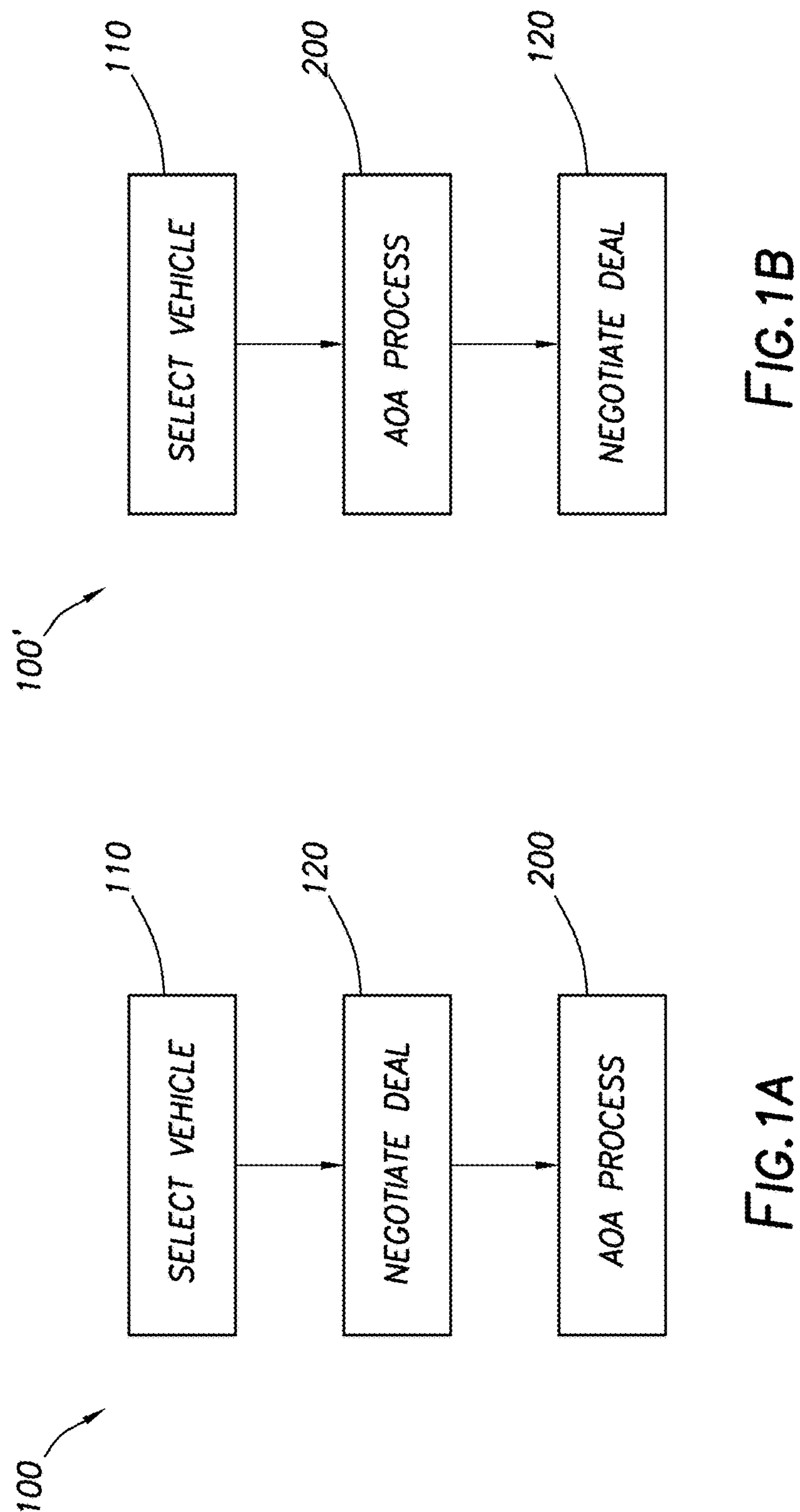
FIG. 1A is a flow chart depicting a customizing vehicle process consistent with at least one embodiment of the present disclosure.
FIG. 1B is flow chart depicting a customizing vehicle process consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As used herein, a "GUI" is a graphical user interface in which data may be displayed and entered. In certain non-limiting embodiments, the GUIs described below may be customized depending on the device on which they are displayed. For instance, vehicle selection GUI 212 as discussed below may display different information when displayed on a computer terminal screen then when displayed on a tablet or smartphone screen.

As used herein, "Add-On-Auto process" or "AOA process" refers to the process of selection of accessories or a group of accessories for a vehicle.

As used herein, "retailer" refers to any seller of vehicles, with a physical presence, such as having a car lot, or a virtual presence, such as a website, or a combination thereof As used herein, a "salesperson" refers to any employee of a retailer.

As used herein, "deal" refers to an agreement between a retailer and a customer that includes a specific vehicle and the terms at which the vehicle is purchased or leased.

As depicted in FIG. 1A and FIG. 1B, in some embodiments of the present disclosure, customizing vehicle process 100 and 110' may include the steps of select vehicle 110, negotiate deal 120, and perform AOA process 200. In select vehicle 110, the customer selects the vehicle he wishes to purchase or is considering purchasing. The vehicle the customer wishes to purchase may be specific, i.e., a vehicle specified by a VIN, or basic, i.e., determined by such aspects as make, model, year, color, and trim package. In certain embodiments, a basic vehicle is designated by at least make, model, and year. Select vehicle 110 may be performed in-person, such as between the customer and a salesperson at a physical site of the retailer, or over a wide-area network such as the internet.

In certain embodiments, as shown in FIG. 1A, after the customer selects the vehicle in select vehicle 110 step, the customer and the retailer negotiate a deal for the car in negotiate deal 120. In other embodiments, as shown in FIG. 1B, after the customer selects the vehicle in select vehicle 110 step, the AOA process is performed in perform AOA process 200. In some embodiments, negotiate deal 120 is omitted. In some embodiments, select vehicle 110 and negotiate deal 120 are omitted, for instance, in an embodiment where a potential customer accesses the AOA process, for instance, through a wide area network such as the internet. In yet another embodiment, select vehicle 110 and negotiate deal 120 may be omitted when the customer has already purchased a vehicle, such as from the retailer previously or another retailer.

Figure 2:
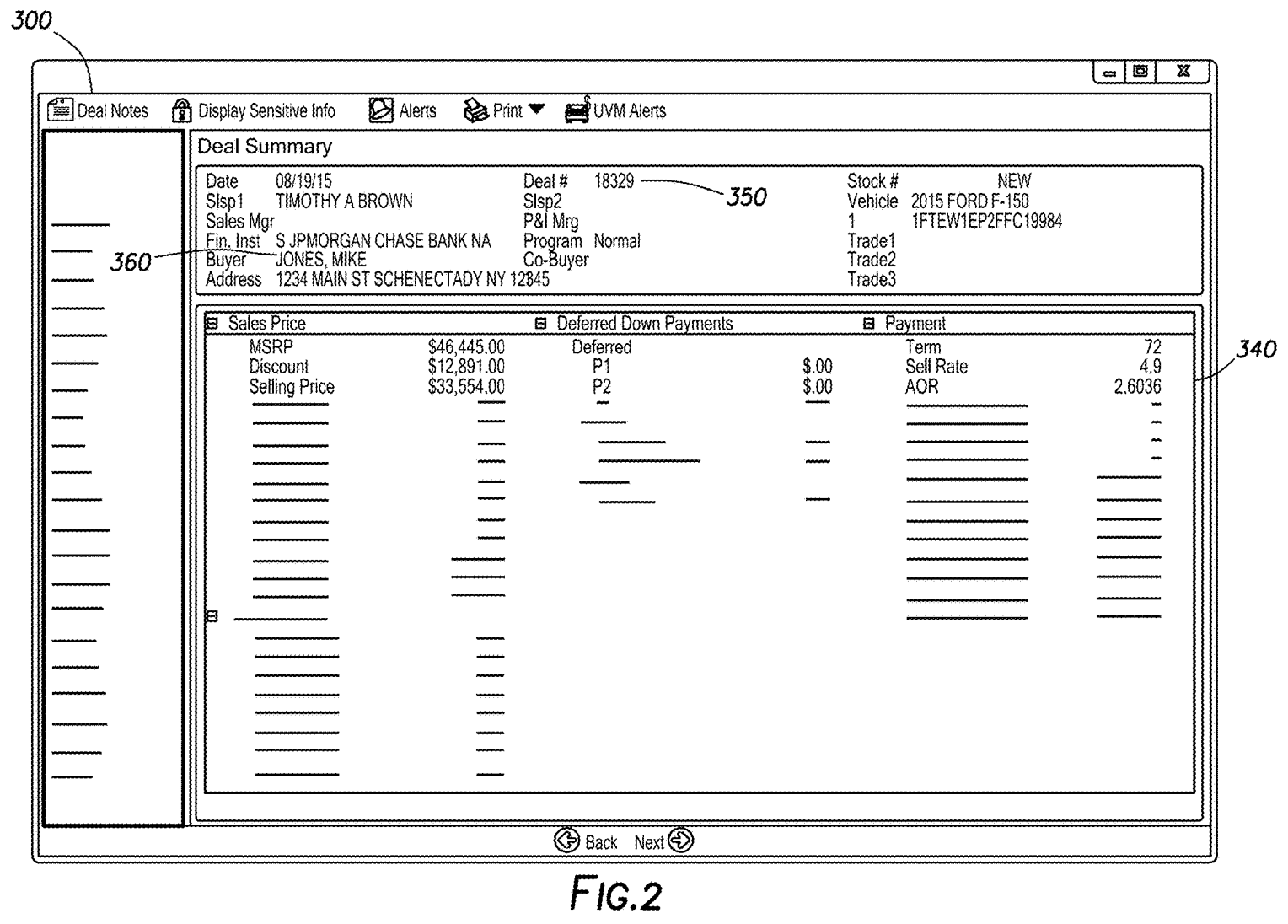

In negotiate deal 120, retailer employees, including for instance the salesperson, sales manager, and others, negotiate with the customer under what terms the customer will purchase the specific vehicle. An example of an online negotiation system that may be used is described in U.S. application Ser. No. 14/877,366, which is fully incorporated by reference. Certain of these terms, as well as information about the customer and the vehicle to be purchased, may be entered into and located in a deal database as part of negotiate deal 120. A deal database is a database on a non-transitory, computer-readable medium in which information and documents regarding deals are stored. Deal summary 300 of such a deal is shown in FIG. 2. Deal summary 300 may include the deal date, salesperson, vehicle identification, which may include the VIN, and deal terms 340, which may include the sales price, any down payment, and financing terms. Deal summary 300 may further include deal number 350, i.e., a unique identifier associated with the deal, and customer identifier 360, which may include the customer's name and address. The deal associated with deal summary 300 may include additional information including, but not limited to, the customer, the retailer and its employees, the vehicle, and the deal terms, some or all of which may be stored in the deal database.

Figure 3:
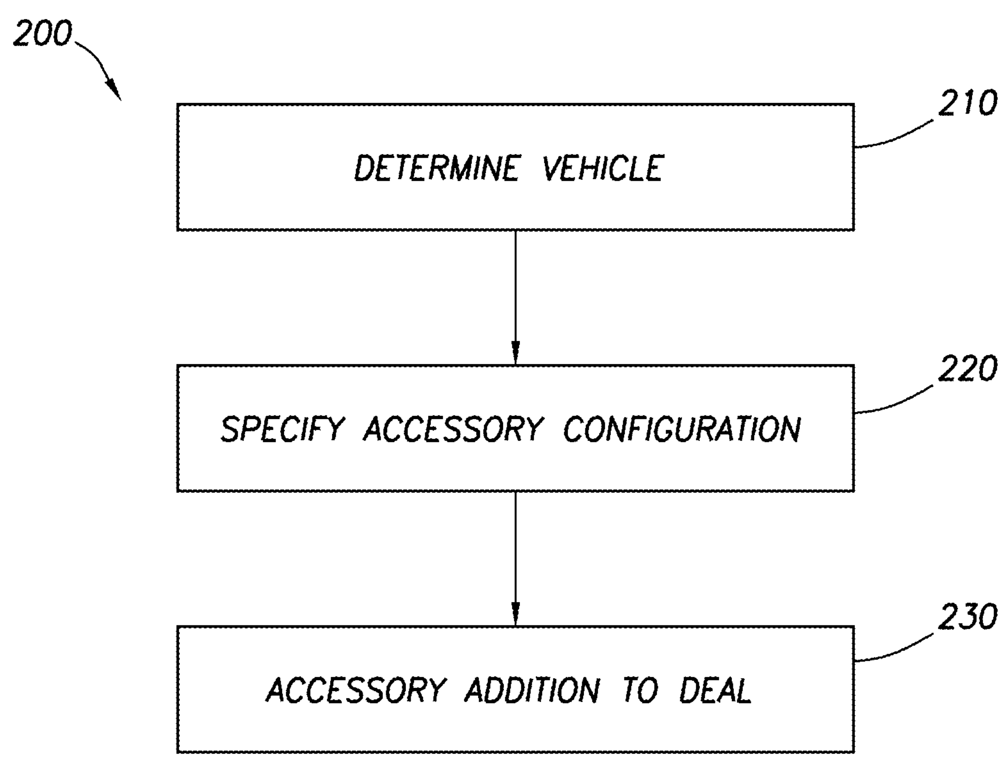
FIG. 3 is a flow chart depicting an AOA process consistent with at least one embodiment of the present disclosure.

AOA process 200, as depicted in FIG. 3, may include multiple steps. The steps of AOA process 200 may be performed through use of a computer. For instance, in certain embodiments, AOA process 200 includes the step of determine vehicle 210. Determine vehicle 210 provides the specific or basic vehicle for use in specify tire and lift kit accessory configuration 220. Determine vehicle 210 may be accomplished through electronic means. For instance, determine vehicle 210 may be accomplished by retrieving information regarding a specific vehicle from the deal database. In other embodiments, determine vehicle 210 may be accomplished by receiving from an input device, including, but not limited to, a keyboard or a mouse, at least the make, model, year, and color of a basic vehicle or the VIN of a specific vehicle.

Figure 4:
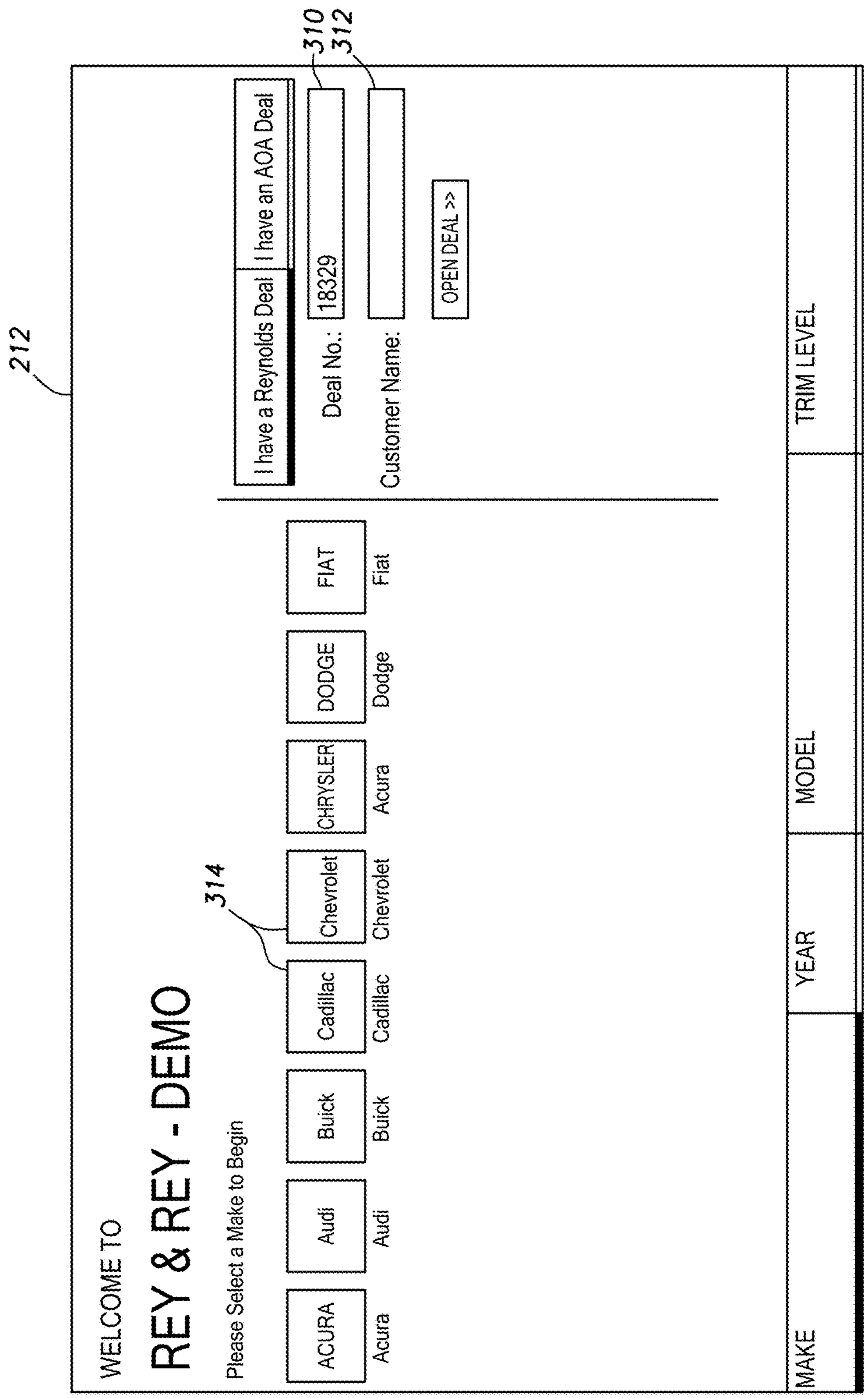
FIG. 4 is a depiction of a vehicle selection GUI make selection consistent with at least one embodiment of the present disclosure.
Figure 12:
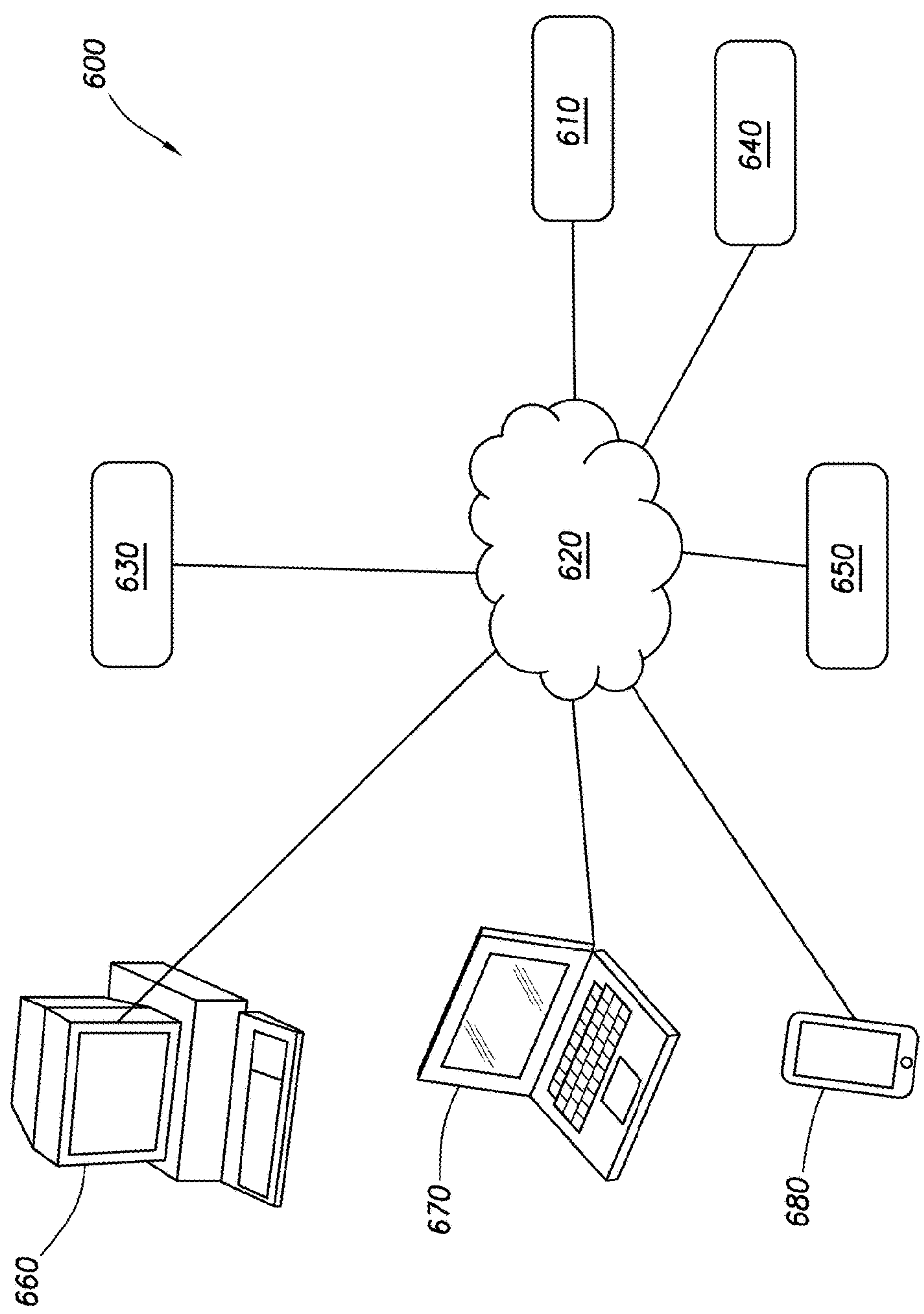
FIG. 12 is a depiction of an embodiment of AOA computer system consistent with at least one embodiment of the present disclosure.

In some embodiments of the present disclosure, as part of the step of determine vehicle 210, vehicle selection GUI 212 as shown in FIG. 4 may be used to enter data to retrieve information regarding the specific vehicle or enter information regarding a basic vehicle. In vehicle selection GUI 212, a deal, such as the deal negotiated in the step of negotiate deal 120 in FIG. 1A, may be selected, for instance, by entering the deal number into deal entry window 310 or the customer name into customer name entry window 312. The deal number or customer name may be transmitted to AOA process server 630, as shown in FIG. 12. By selecting the deal through vehicle selection GUI 212, information regarding the deal, such as the year, make, and model of a specific vehicle, may be retrieved from the deal database, such as by AOA process server 630.

Figure 5B:
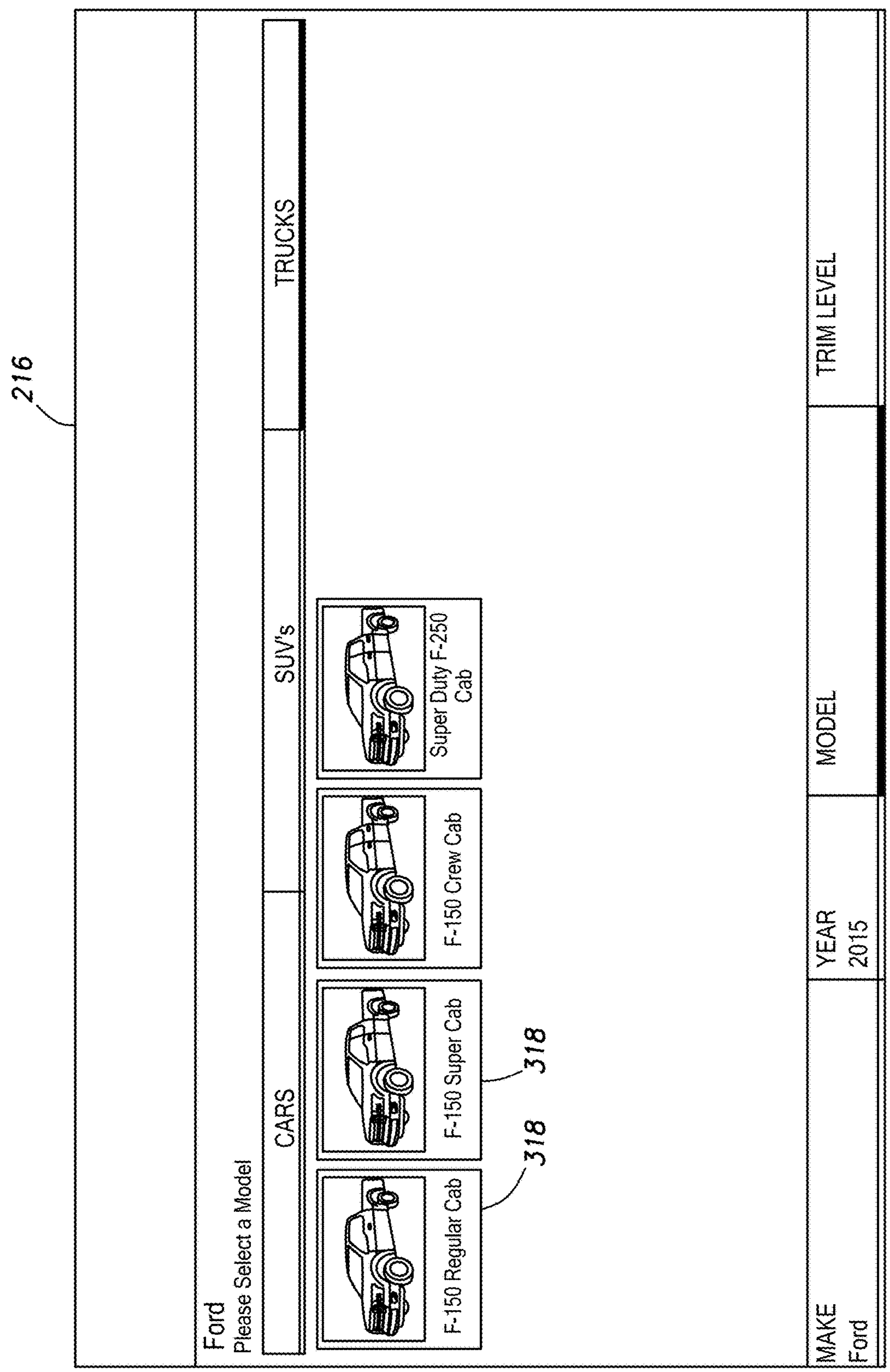
FIG. 5B is a depiction of a model selection GUI consistent with at least one embodiment of the present disclosure.

In certain embodiments, data in the deal database may not include the year or model of the specific vehicle. In other embodiments, a customer may wish to examine different makes, models, or years of basic vehicles. In yet other embodiments, the deal may not be completed, as shown in FIG. 1B. In these embodiments, vehicle selection GUI 212, may allow selection of the make of the vehicle through make selection buttons 314 as shown in FIG. 4. In other embodiments, selection of the make of the vehicle may be performed by a separate GUI other than vehicle selection GUI 212. The year of the vehicle may be selected in year selection GUI 214, as depicted in FIG. 5A, through year selection buttons 316. The model of vehicle may be selected in model selection GUI 216, as depicted in FIG. 5B, through model selection buttons 318. In certain non-limiting embodiments, model selection buttons 318 may include images of generic vehicle models. "Generic," as used herein with reference to a vehicle or image, means a vehicle for which make, model, and year have not yet been specified. Images of generic vehicle models may be stored in a vehicle image database, as described hereinbelow.

Figure 5C:
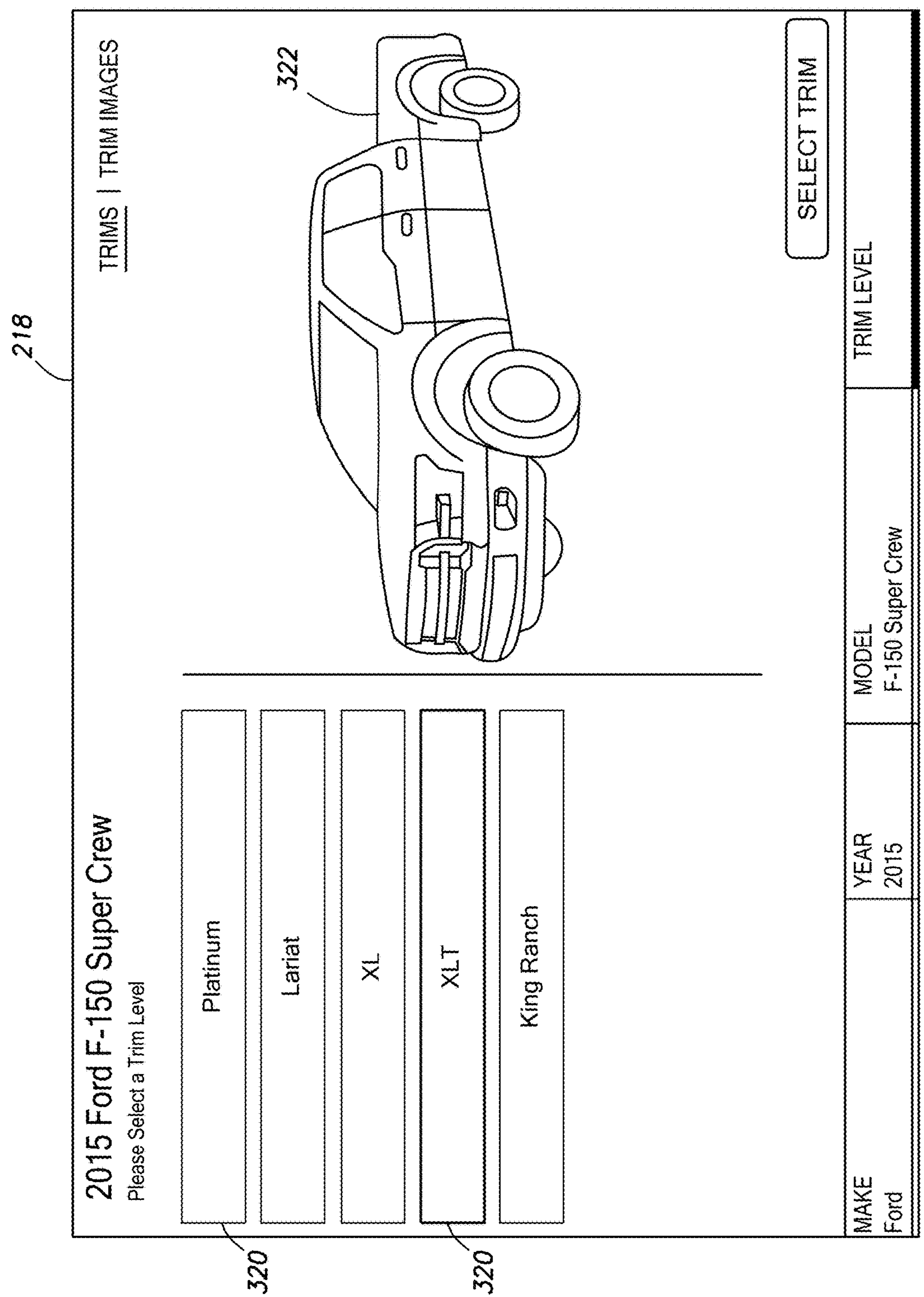
FIG. 5C is a depiction of a trim package selection GUI consistent with at least one embodiment of the present disclosure.

In some embodiments, the trim package may not be included in the deal database for the specific vehicle or may be specified for a basic vehicle by a customer or retailer employee. As used herein, "trim package" means a set of cosmetic embellishments on a vehicle. In such embodiments, the trim package of the vehicle may be selected, such as with trim package selection GUI 218, as depicted in FIG. 5C, through use of trim selection buttons 320. In certain embodiments, use of a trim selection button 320 may result in display of vehicle image 322 from vehicle image database having the make, model, and trim package selected through vehicle selection GUI 212, year selection GUI 214, model selection GUI 216, and trim package selection GUI 218.

In some embodiments, the exterior and interior colors of the vehicle may not be included in the deal database for the specific vehicle or may be specified for a basic vehicle by a customer or retailer employee. Interior and exterior colors of the vehicle may be selected, such as with color selector GUI 222 through exterior color buttons 324 and interior color buttons 326. In certain embodiments, use of exterior color button 324 may result in display of exterior vehicle image 328 from the vehicle image database having the make, model, trim package, and exterior color selected through vehicle selection GUI 212, year selection GUI 214, model selection GUI 216, trim package selection GUI 218, and color selector GUI 222. In certain embodiments, use of interior color button 326 may result in display of interior vehicle image 330 from the vehicle image database having the make, model, trim package, and interior color selected through vehicle selection GUI 212, year selection GUI 214, model selection GUI 216, trim package selection GUI 218, and color selector GUI 222. Vehicle selection GUI 212, year selection GUI 214, model selection GUI 216, trim package selection GUI 218, and color selector GUI 222 are non-limiting examples and other selection GUIs may be used to select information about the vehicle of the deal.

Once the specific vehicle of the deal or the basic vehicle has been selected, such as by retrieving information regarding the vehicle from the deal database or the deal database in conjunction with the selection GUIs discussed above, only through the selection GUIs discussed above, or by otherwise determining the specific or basic vehicle, the customer in conjunction with retailer employees may specify accessories that may be added to the vehicle as part of the step of specify tire and lift kit accessory configuration 220 as shown in FIG. 3. Non-limiting examples of accessories that may be specified include, but are not limited to tires, wheels, and lift kits.

Figure 6:
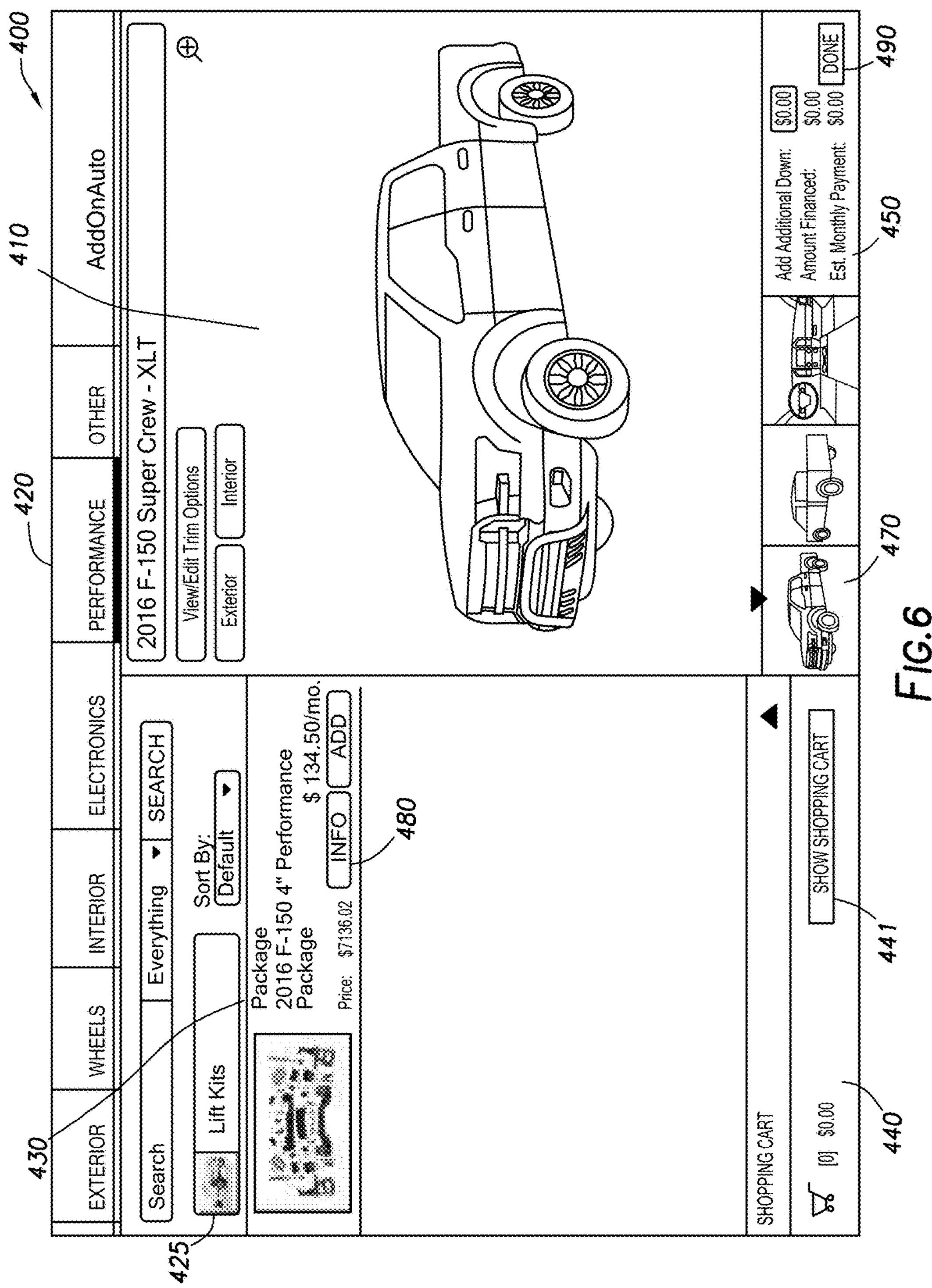
FIG. 6 is a depiction of configurator GUI consistent with at least one embodiment of the present disclosure.

Certain accessories may be specified through the use of configurator GUI 400, as shown in FIG. 6. Configurator GUI 400 may include vehicle animation window 410. Prior to specifying tire and lift kit accessories, vehicle animation window 410 may depict the specific vehicle or basic vehicle based on information about the deal from the deal database, vehicle selection GUI 212, year selection GUI 214, model selection GUI 216, trim package selection GUI 218, and color selector GUI 222, other GUIs, or other inputs. In other embodiments, in addition to the specific or basic vehicle, other accessories than tire and lift kit accessories may be animated onto the specific vehicle or basic vehicle prior to animating the tire and lift kit accessories, such as described in U.S. application Ser. No. 15/287,350, which is incorporated herein by reference. Configurator GUI may include tire and lift kit accessories list 430. Tire and lift kit accessories list 430 may list and/or depict tire and lift kit accessories that may be added to the depiction of the specific or basic vehicle in vehicle animation window 410. Access to sets of tire and lift kit accessories in tire and lift kit accessory list 430 may be controlled by navigation user interface elements such as tire and lift kit accessory user interface elements 420 and tire and lift kit accessory elements user interface element 425. Tire and lift kit accessory category user interface elements 420 allow a user to decide upon certain categories of accessories, shown in FIG. 6 as lift kits, although lift kits are merely an example and other categories are possible. Tire and lift kit accessory user interface elements 420 allow a user to select which type of tire and lift kit accessory within the categories of tire and lift kit accessories the user wishes to consider for depiction in vehicle animation window 410.

The specific or basic vehicle image displayed in vehicle animation window 410 prior to specifying tire and lift kit accessories is referred to as a base image or modified base image. In certain embodiments, a base image may be determined by the year, make, model and trim package of the specific or basic vehicle. Base images may be constructed from digital photographs of basic vehicles stored in raw image files, such as a DNG file. In other embodiments, base images of basic vehicles may be supplied by new car manufacturers. In some embodiments, the raw image file may be converted to a layered image file, such as a .PSD file for use in an image manipulation program, such as Adobe PhotoShop. In some embodiments, the base image may be modified to include such features as shadows and highlights.

In some embodiments, base images in a layered image file may be manipulated through the image manipulation program to produce one or more modified base images of a color or trim package different from the original base image. For instance, a base image may be of a pick-up truck having a standard bed. The modified base image may have manipulated to form a digital image of a pick-up truck having a short or long bed. This process of producing modified base images may be repeated for multiple color or trim packages. In some embodiments, the base images and modified base images may include a ¾ front view, a ¾ rear view, an interior view, or a combination thereof.

In certain embodiments, base images and modified base images may be made up of multiple image layers, for example and without limitation, between three and fifteen image layers, between five and ten image layers, or five image layers. In a non-limiting example, base images and modified base images may be made up of, for instance and without limitation, five image layers, such as exterior image layer 902, as shown in FIG. 13A, underbody image layer 904, as shown in FIG. 13B, shadow image layer 906, as shown in FIG. 13C, rim image layer 908, as shown in FIG. 13D, and tire image layer 910, as shown in FIG. 13E. Exterior image layer 902 may include the painted area of the vehicle (body) and the non-painted area (non-body), such as the window, grill, headlights, and tail lights. Rims image layer 908 may be an image of a wheel design. Tires image layer 910 may be an image of a tire. Underbody image layer 904 may be an image of the underbody. Shadow image layer 906 may be of the shadow of the vehicle. The image layers listed are exemplary only and other image layers are contemplated by this disclosure. For instance, certain image layers may be combined or omitted entirely. As an example, shadow image layer 906 may be omitted.

In certain embodiments, the image layers may be arranged in a viewing order in vehicle animation window 410 in accordance with a depth number, e.g., with image layers placed over one another based on the depth number. In certain embodiments, the lower depth number image layers are placed behind the higher depth number image layers in vehicle animation window. One example of a depth number scheme is shown below.

TABLE 1

| Layer | Depth Number |
|---|---|
| Rims image layer | 0 |
| Exterior image layer | −5 |
| Underbody image layer | −10 |
| Tires image layer | −15 |
| Shadow image layer | −20 |

Thus, in the example given, shadow image layer 906 is behind all other image layers. Tires image layer 910 is overlaid onto shadow image layer 906, followed by underbody image layer 904, exterior image layer 902, and rims image layer 908.

Digital images of tires and lift kit accessories may be obtained from such sources as original equipment manufacturers (OEMs), tire and lift kit accessory manufacturers, captured from images on the internet, or captured through digital photography of physical accessories. Digital images of tire and lift kit accessories may be converted to an image file suitable for use in an image manipulation application, such as PhotoShop.

In some embodiments of the present disclosure, digital images of tire and lift kit accessories may be used to form an overlay. An overlay is an image that may be overlaid onto the base image or modified base image.

When particular accessories are selected in configurator GUI 400, AOA process server 630 may layer the base image with the overlay to form an accessorized image, a process referred to as "animation." In certain embodiments, multiple overlays with different accessories may be overlaid onto the base image or modified base image to form an accessorized image as the different accessories are selected through configurator GUI 400.

Figure 14A:
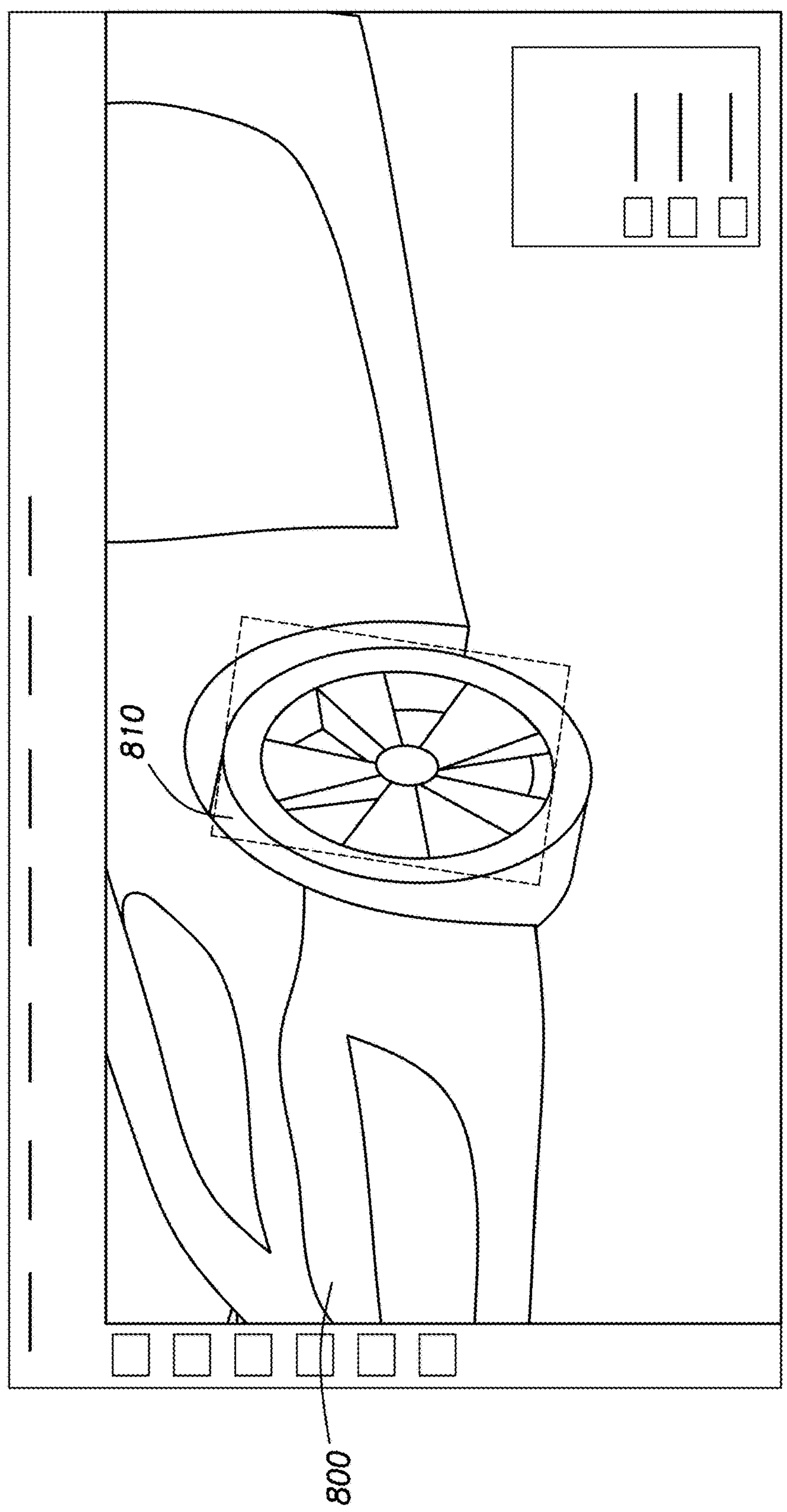
FIGS. 14A-14D depict modification of a base image using dynamic image placement consistent with at least one embodiment of the present disclosure.
Figure 14B:
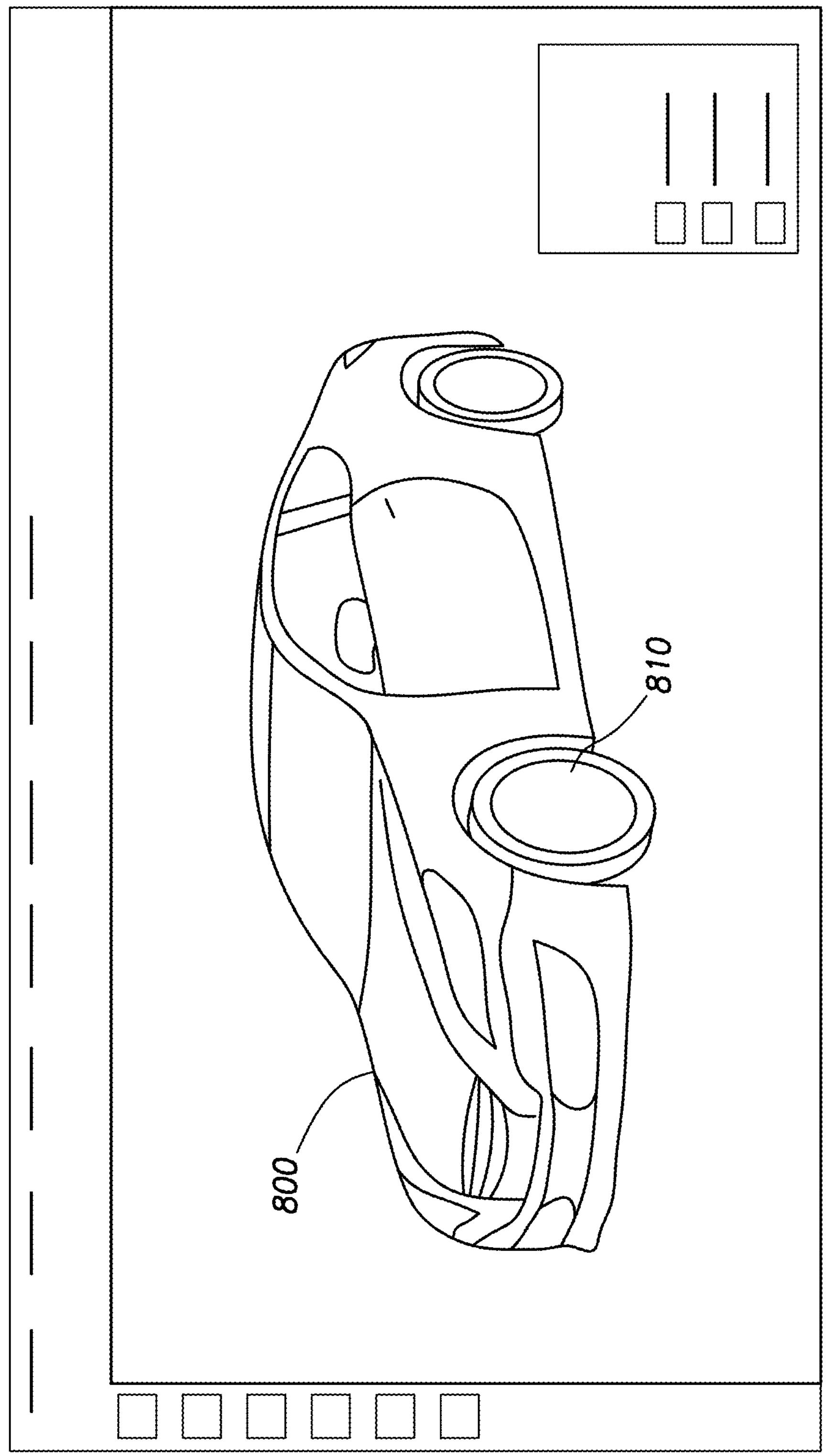
Figure 14C:
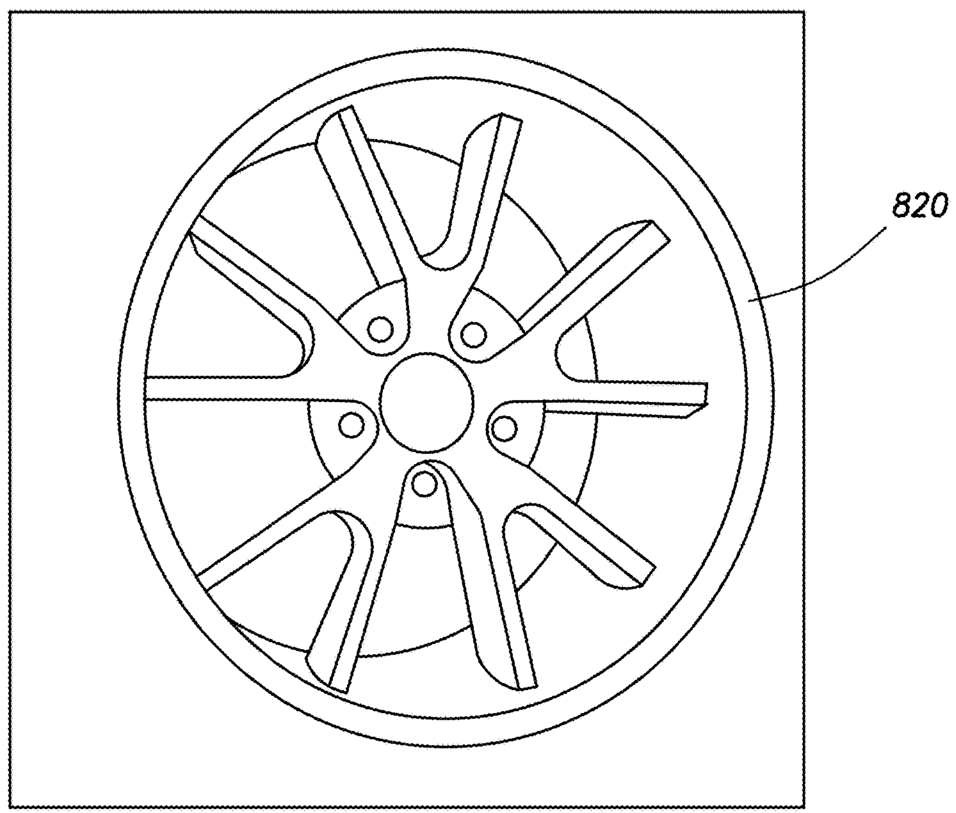
Figure 14D:
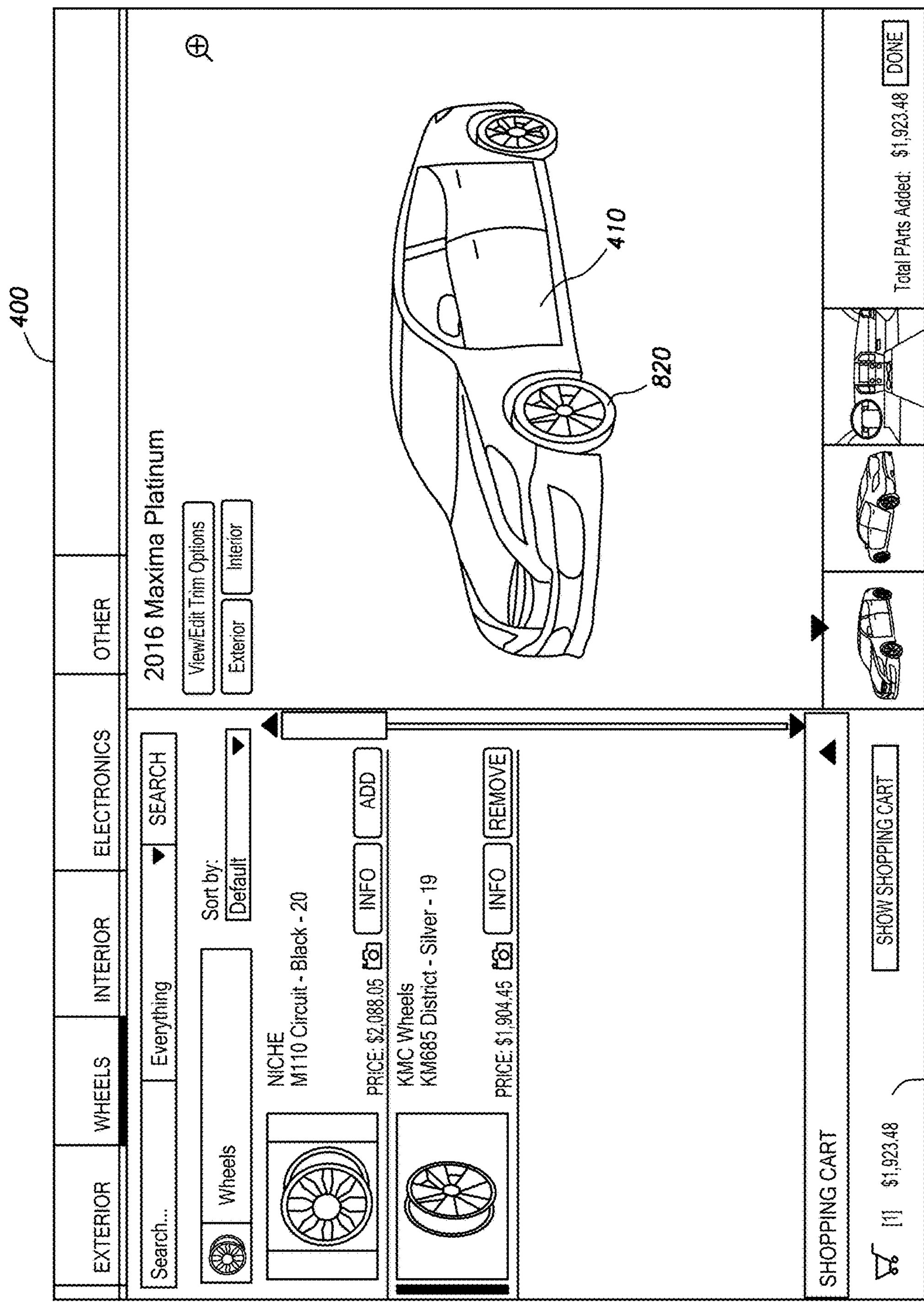

In other embodiments, such as for wheels, rather than form an overlay, AOA process server 630 may use a process referred to herein as dynamic image placement. In dynamic image placement, the base image or modified base image may be mapped at least in part and the portion of the image where the potential tire and lift kit accessory may be positioned is selected. As shown in FIG. 14A, stock rim portion 810 of modified base image 800 is selected. Rather than use an overlay, as shown in FIG. 14B, stock rim portion 810 may be removed from the modified base image. As shown in FIG. 14C, wheel accessory image 820 corresponding to a wheel selectable in configurator GUI 400 may be selected and the wheel accessory 820 may replace the image of stock rim portion 810, as shown in FIG. 14D.

Tire and lift kit accessories, as discussed hereinabove, are not only placed on the vehicle, but may alter the profile of the vehicle, i.e., tires with a different diameter than those supplied by the manufacturer may raise or lower the body of the vehicle. Similarly, lift kits may raise or lower the vehicle. To represent the new vehicle profile, the image layers of the base image may be moved relative to each other.

With respect to lift kits, in certain embodiments of the present disclosure, a lift kit "package" may be constructed. The lift kit package is a set of equipment grouped together to form a lift kit accessory. In certain embodiments, lift kit packages include tires. In other embodiments, lift kit packages do not include tires. In lift kit GUI 700, as shown in FIG. 10, lift kit name may be selected (lift kit name 702) and lift kit height may be selected (lift kit height 704). Lift kit height controls how high the vehicle body lifts, as depicted in vehicle animation window 410, as described herein below.

Figure 7:
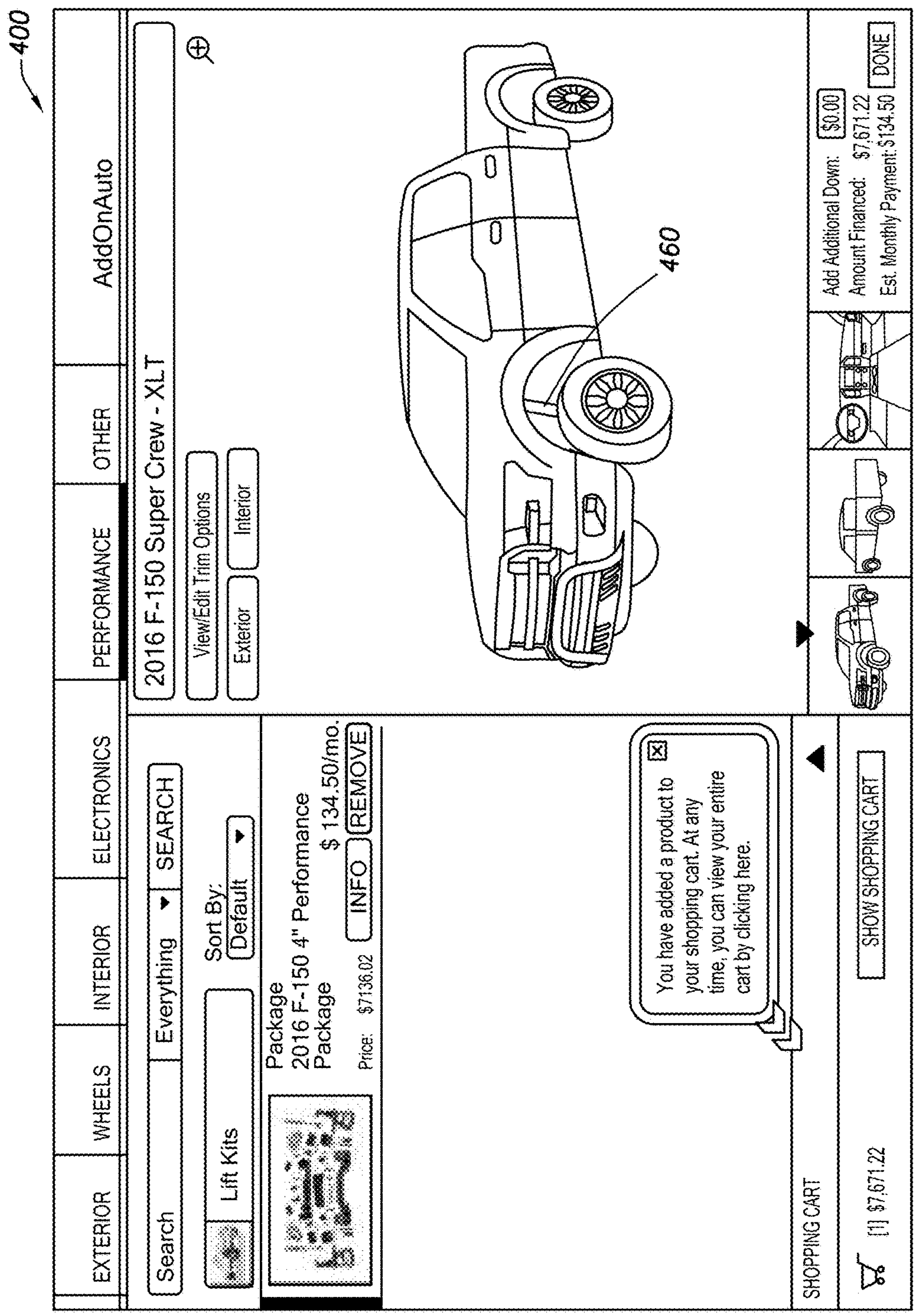
FIG. 7 is a depiction of configurator GUI consistent with at least one embodiment of the present disclosure.

Selection of a tire or lift kit from tire and lift kit accessory list 430 will animate the selected tire or lift kit accessory onto the base image or modified base image of the vehicle depicted in vehicle animation window 410. As shown in FIG. 7, depicted element 460 has been animated onto the original vehicle depiction in vehicle animation window 410. The example shown in FIG. 7 is a lift kit.

With further reference to FIG. 6, configurator GUI 400 may further include tire and lift kit accessory tally window 440, entitled "shopping cart." Tire and lift kit accessory tally window 440 may interface with a tire and lift kit accessory tally database that tallies what accessories a customer has selected and in certain embodiments the cost of those accessories. Configurator GUI 400 may further include tire and lift kit accessory pricing window 450. Tire and lift kit accessory pricing window 450 may display the cost of the tire and lift kit accessory to the customer, either as an addition to the customer's financed monthly payment, as shown in FIG. 6, or the actual cost of the tire and lift kit accessory to the customer. In addition, configurator GUI 400 may include vehicle view user interface elements 470. Vehicle view user interface elements 470 allow the user to change the view of the vehicle in vehicle animation window 410, for instance, to allow the customer to view the vehicle with the animated accessories from a different perspective.

Figure 8:
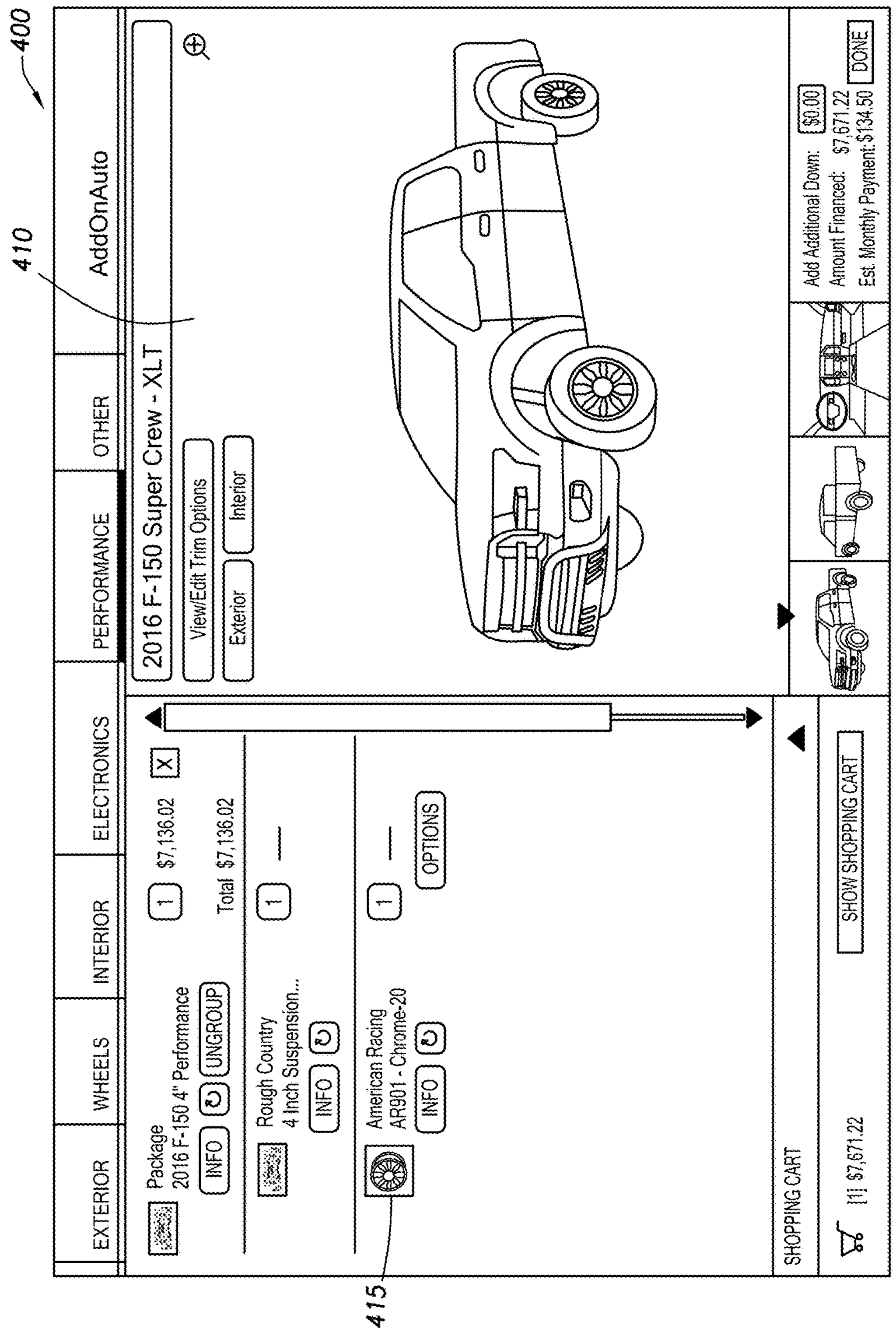
FIG. 8 is a depiction of configurator GUI consistent with at least one embodiment of the present disclosure.

FIG. 8 depicts lift kit package 415. In certain embodiments, a customer may choose to omit one or more of the pieces of equipment in lift kit package 415 through configurator GUI 400. In other embodiments, the tires that are part of the lift kit package may be changed to an alternative tire through configurator GUI 400.

A lift kit package may be created through parts selection GUI 802, as shown in FIGS. 11A-11C. FIG. 11A depicts vehicle designator portion 805 of parts selection GUI 802, which may be used to define for which vehicles the lift kit accessory is designated. Add parts portion 818 of parts selection GUI 802 may be used to designate the equipment that makes up the lift kit package, as shown in FIG. 11B. In certain embodiments, the prices and description of the equipment used as part of the lift kit package may be constructed in parts and equipment portion 830 of parts selection GUI 802, as depicted in FIG. 11C.

Tire and lift kit accessories may alter the base image or modified base image by adjusting the position of the image layers relative to each other. For instance, increasing tire diameter from the original tire diameter of the base image or modified base image may raise the exterior image layer relative to the remaining image layers. Thus, for instance, the exterior layer will be animated to raise in vehicle animation window 410 relative to the other image layers to account for different in tire diameter. Use of a lift kit accessory may raise or lower exterior image layer 902 and underbody image layer 904 with respect to other image layers, such as shadow image layer 906, rims image layer 908, and tire image layer 910.

Vehicle animation window 410 may reflect actual raising or lowering of vehicle components with respect to other vehicle components by raising or lowering image layers by a predetermined number of pixels in vehicle animation window per inch of change in the component location. For instance, with respect to tire accessories, increasing the tire from a 30" tire to a 34" inch tire may raise the vehicle exterior by 2". The animation may reflect this change by raising exterior image layer 902 with respect to the other image layers by a pre-determined number of pixels per inch. Similarly, for certain lift kits that raise the vehicle exterior and underbody, exterior image layer 902 and underbody image layer 904 may be raised with respect to other image layers. The ratio of pixels per inch may range from, for instance, in certain embodiments, between 1 and 15 pixels per inch, 4 and 10 pixels per inch, or 6 pixels per inch. When the pixels per inch ratio is 6 pixels per inch, increasing time diameter from 30 to 34 inches may raise exterior image layer 902 relative to shadow image layer 906, for instance, 12 pixels.

Similarly with respect to lift kit accessories, certain image layers of the base or modified base image may move relative to other image layers. For instance, a lift kit may raise the exterior layer relative to the tire layer. With some lift kit accessories, more of the underbody layer may be exposed as the exterior layer is raised relative to the underbody layer. As with tire accessories, vehicle animation window may reflect these changes in layer height by raising the containers a predetermined number of pixels relative to the other image layers.

In certain embodiments, a customer may choose a tire with a larger diameter in addition to a lift kit. In such cases, image layers of the base image or modified base image may be moved relative to one another based on both the lift kit accessory and the tire accessory.

Figure 15A:
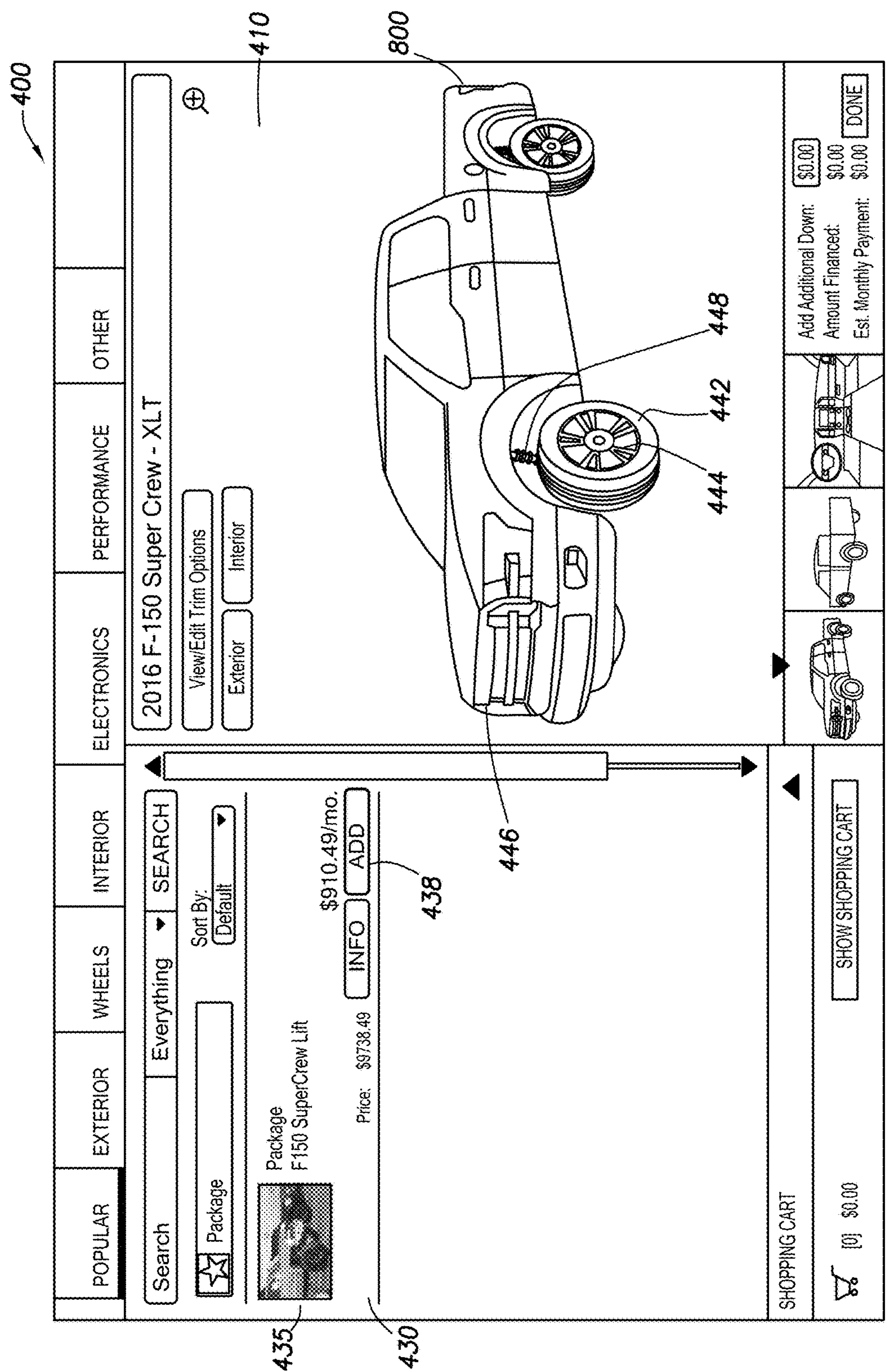
FIGS. 15A-15D depict animation of a lift kit and tire accessory onto a base or modified base image consistent with at least one embodiment of the present disclosure.

FIGS. 15A-15D depict the addition of a non-limiting example of a lift kit accessory in vehicle animation window 410. In FIGS. 15A-15D, the lift kit package includes tires, wheels, grill, and equipment associated with raising the vehicle and modifying vehicle performance, which may include shocks and/or struts, leaf springs, control arms, trailing arms, driveshaft and steering components. FIG. 15A depicts base image 800 in vehicle animation window 410. Base image 800 include exterior 448, standard tire 442, standard wheel 444, and standard grill 446. "Standard," as used herein, refers to equipment that is part of the trim package of the base image. Lift kit package 435, shown in FIG. 15A as "F150 SuperCrew Lift," may be selected by user interface with configurator GUI 400, shown as "ADD" button 438 in FIG. 15A.

Figure 15B:
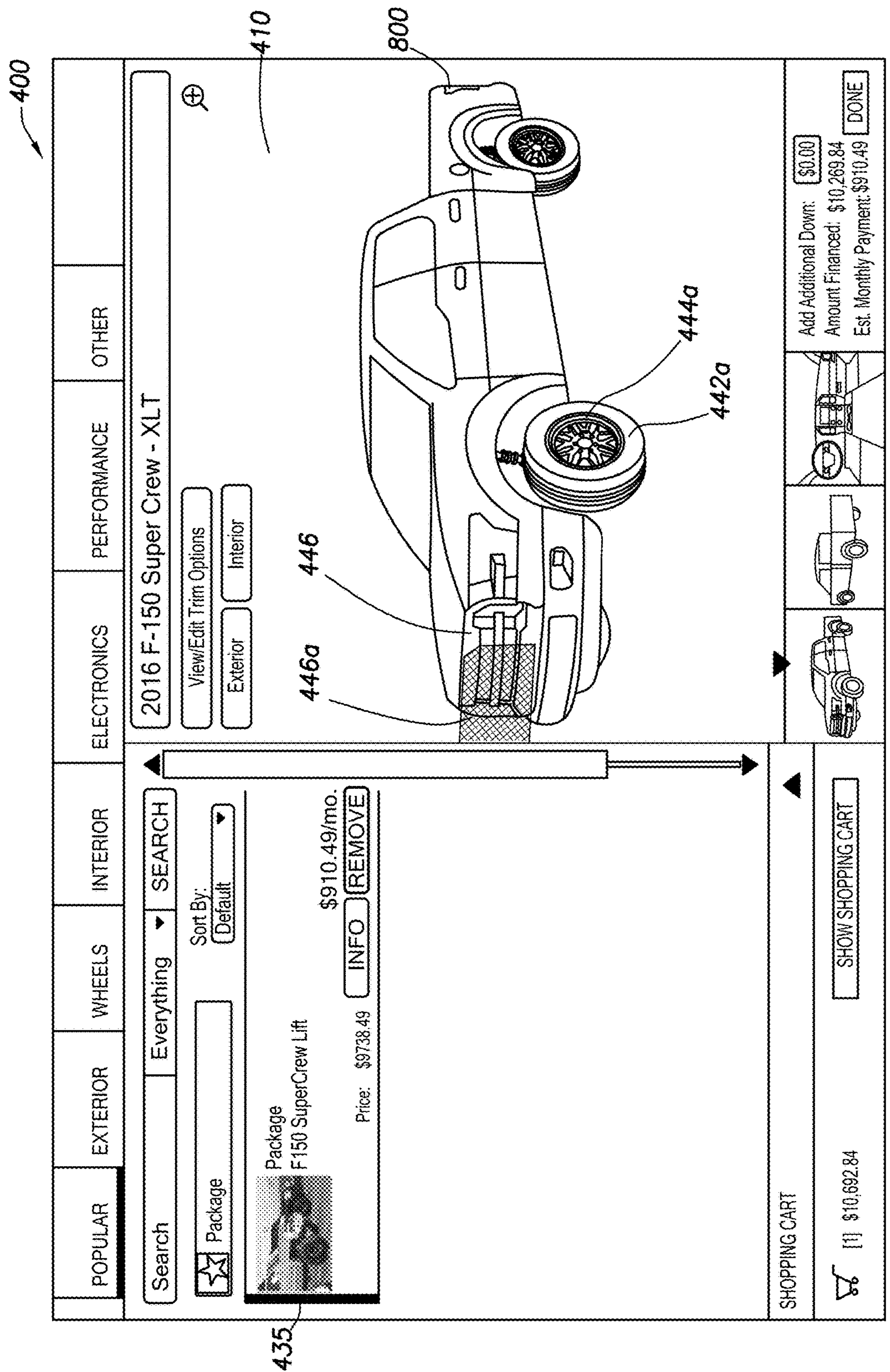
Figure 15C:
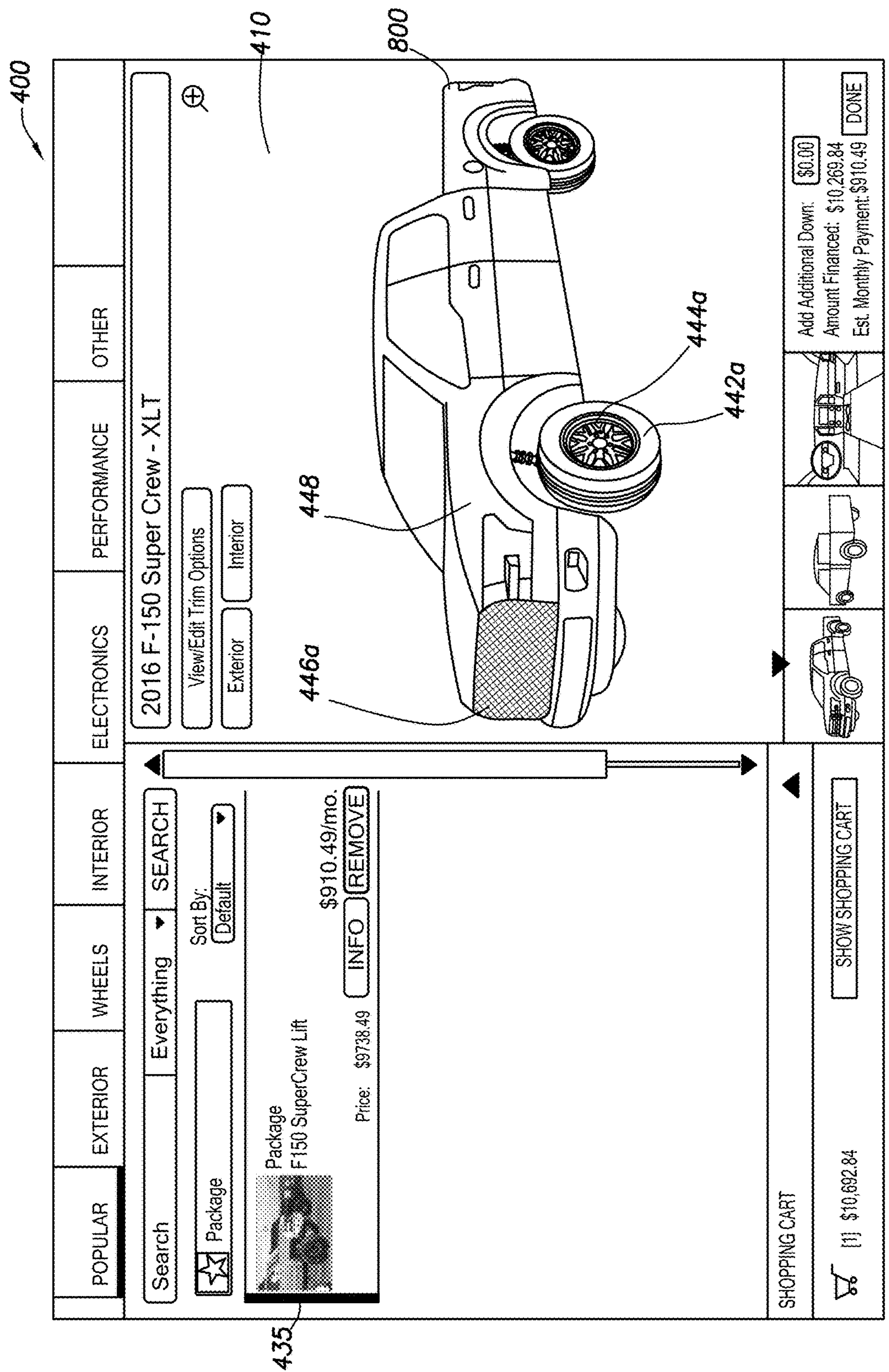

FIG. 15B depicts an in-process view of the addition of lift kit tire 442*a*, lift kit wheel 444*a*, and lift kit grill 446*a*. As shown in FIG. 15B, standard tire 442 has been replaced with lift kit tire 442*a*, and standard wheel 444 has been replaced with lift kit wheel 444*a*. As further shown in FIG. 15B, lift kit grill 446*a* is in process of being animated onto base image 800. In certain embodiments, such as shown in FIG. 15B, until animated onto base image 800, accessories, such as lift kit grill 446*a*, may be "grayed out," i.e., semi-transparent, as shown in vehicle animation window 410. In FIG. 15C, lift kit grill 446*a* has animated onto base image 800.

Figure 15D:
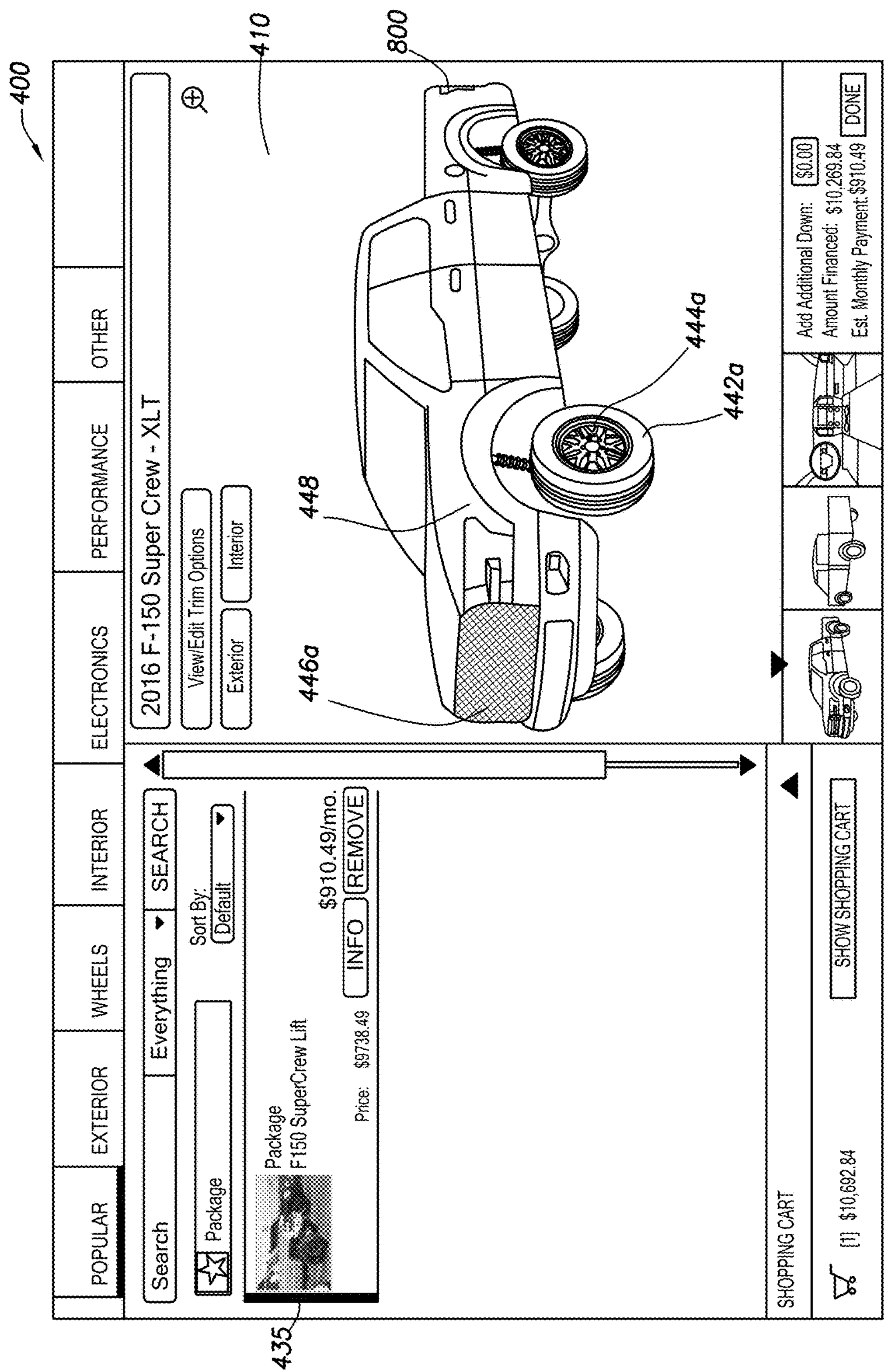

FIG. 15D depicts base image 800 after exterior 448 and lift kit grill 446*a* have been raised relative to lift kit tire 442*a* and lift kit wheel 444*a*, as discussed above.

Figure 9:
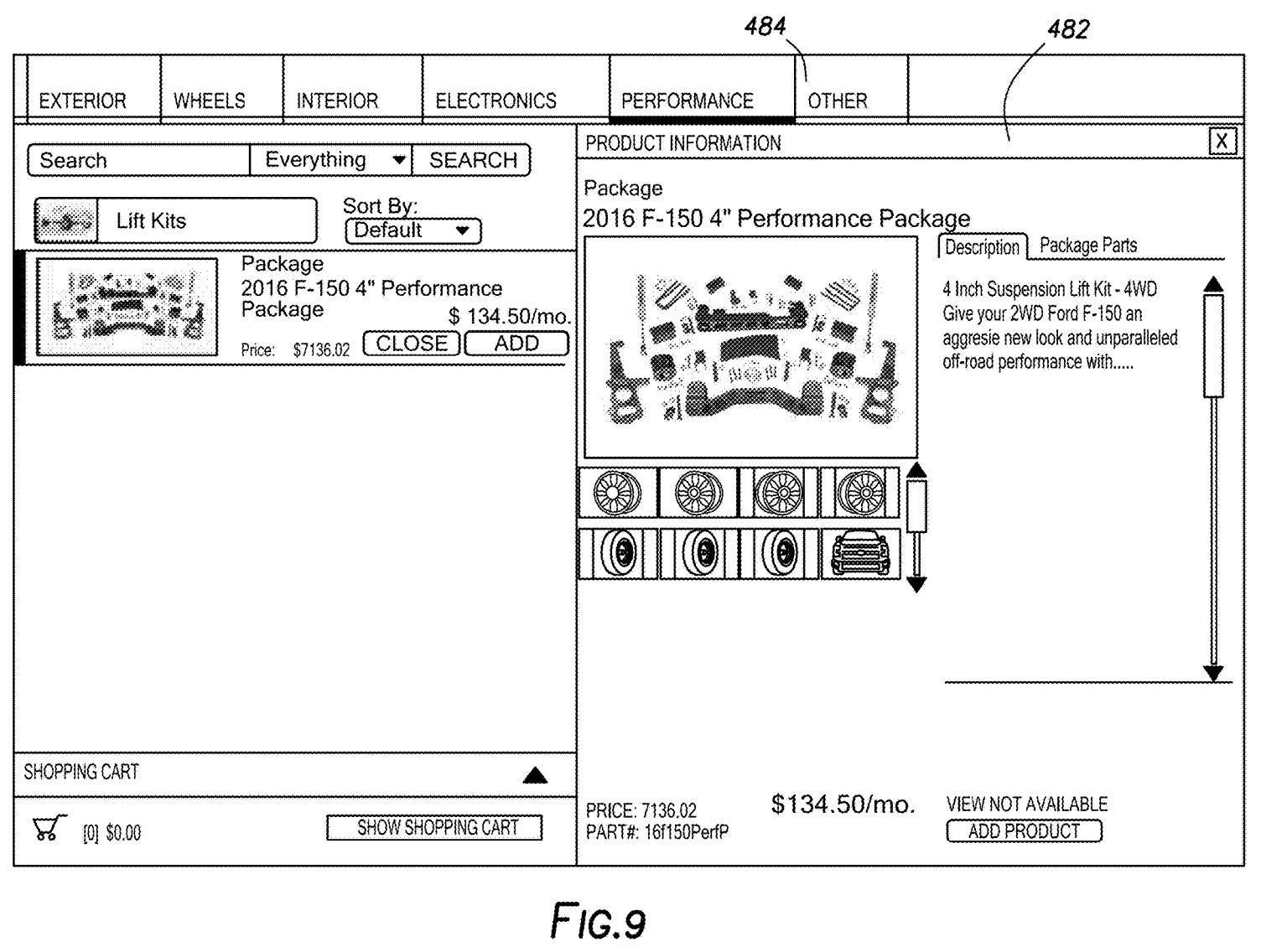

Configurator GUI 400 may further include additional information user interface elements 480. Additional information user interface elements 480 may provide a link to an external database or information system such as the internet that allows additional information to be shown in vehicle animation window 410. FIG. 9 depicts an example of the use of additional information user interface elements 480. As shown in FIG. 9, once selected, additional information user interface elements 480 display at least one media element, such as, for example and without limitation, text information 482 and video 484 in vehicle animation window 410.

Tire and lift kit accessory tally window 440 may include tally review user interface element 441, entitled "view shopping cart" on FIG. 6.

After the customer has completed selection of the accessories through configurator GUI 400, specify tire and lift kit accessories configuration step 220 may be completed through selection of tire and lift kit accessory completion user interface element 490, entitled "DONE" in FIG. 6. After specify tire and lift kit accessory configuration step is completed, as shown in FIG. 3, the AOA process includes tire and lift kit accessory addition to deal step 230.

In certain embodiments of the present disclosure, after the tire and lift kit accessories selected by the customer are imported into the deal database, the tire and lift kit accessories selected by the customer may be ordered by the retailer from a third party, such as a tire and lift kit accessories vendor, or designated for the customer from existing retailer inventory, such as the retailer's service department. In these embodiments, the customer may be scheduled for a service department appointment wherein the tire and lift kit accessories selected by the customer are installed. In other embodiments, the tire and lift kit accessory may be installed by a third party, such as a tire and lift kit accessories installer. In these embodiments, the customer may be scheduled for an appointment for installation of the tire and lift kit accessory with the third party, wherein the tire and lift kit accessories are installed. As one of ordinary skill in the art with the benefit of this disclosure will appreciate, a combination of these embodiments may be employed, i.e., certain tire and lift kit accessories may be installed by the retailer service department and other tire and lift kit accessories may be installed by a third party.

Although depicted herein as using buttons in the various GUIs, one having ordinary skill in the art with the benefit of this disclosure will understand that any user interface element may be utilized without deviating from the scope of this disclosure. For example and without limitation, interactive elements may include buttons, drop down lists, radio buttons, check boxes, list boxes, dropdown buttons, toggles, text fields, or sliders, as understood in the art.

FIG. 12 depicts an embodiment of AOA computer system 600 on which customizing vehicle process 100 may be operated. AOA computer system 600 may include deal database server 610. Deal database server 610 may include the deal database in which information and documents regarding deals are stored. In the embodiment shown in FIG. 12, deal database server 610 may be accessed, such as through network 620, by AOA process server 630. Network 620 may include one or more local area or wide area networks. The wide area network may be the internet. AOA computer system 600 may also include vehicle image database server 640. Vehicle image database server 640 may include a vehicle image database on which digital images of basic vehicles are stored on a non-transitory, computer readable medium. Vehicle image database server 640 may be accessed, such as through network 620, by AOA process server 630. AOA computer system 600 may also include tire and lift kit accessory database server 650. Tire and lift kit accessory database server 650 may include a tire and lift kit accessory database on which digital images of tire and lift kit accessories are stored on a non-transitory computer readable medium. Tire and lift kit accessory database server 650 may be accessed, such as through network 620, by AOA process server 630. In certain embodiments, vehicle image database server 640 and tire and lift kit accessory database server 650 may be the same physical server, i.e., the vehicle image database and the tire and lift kit accessory database may reside on the same server. In yet other embodiments, one or both of the vehicle image database and tire and lift kit accessory database may be located on a shared computing resource, such as an internet-based shared computing resource. An examples of an internet-based shared computing resource is cloud computing.

AOA process server 630 may include instructions on a non-transitory, computer readable medium for performing the processes outlined above with respect to AOA process 200, generation and updating of GUI's, presentment of images, and data transmission to and receipt from remote devices 660, 670, 680. In certain embodiments, AOA process server may retrieve all or part of the vehicle image database and the tire and lift kit accessory database and store the images on the non-transitory computer readable medium of AOA process server 630. In certain embodiments, retrieval of all or part of the vehicle image database and the tire and lift kit accessory database may be performed on a periodic basis. Remote devices 660, 670, 680 include, for example and without limitation, desktop computer 660, lap top computer 670, and mobile device 680.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A computerized method for adding lift kits or tires to vehicle images:

providing a plurality of image layers;

constructing a base image or modified base image from the plurality of image layers;

selecting a tire or lift kit accessory;

retrieving an accessory image corresponding to the tire or lift kit accessory; and animating the accessory image onto the base image or modified base image including:

selecting a portion of a base image or modified base image wherein the tire or lift kit accessory image is to be positioned;

removing the portion of the base image;

replacing the portion of the base image with the tire or lift kit accessory image;

raising a first image layer relative to a second image layer in the vehicle animation window, wherein the distance the first image layer is raised relative to second image layer is correlated to the distance the tire or lift kit accessory raises a first part of a vehicle corresponding to the first image layer relative to a second part of the vehicle corresponding to the second image layer, wherein the first image layer is raised relative to the second image layer a number of pixels corresponding to the number of inches the first part of the vehicle is raised relative to the second part of the vehicle.

2. The method of claim 1, wherein each image layer is assigned a depth number and wherein the depth number determines the position of each image layer when constructing the base image or modified base image.

3. The method of claim 2, wherein the image layers are overlaid in accordance with the depth number.

4. The method of claim 1, wherein the step of animating the accessory image onto the base image or modified base image comprises moving at least one image layer relative to another image layer.

5. The method of claim 1, further comprising prior to the step of selecting a tire or lift kit accessory:

generating a configurator GUI, the configurator GUI having a tire and lift kit accessories list and a vehicle animation window.

6. The method of claim 5, wherein the step of selecting a tire and lift kit accessory further comprises:

selecting a tire or lift kit accessory from the tire or lift kit accessory list.

7. The method of claim 6 further comprising after the step of retrieving a base image or modified base image but prior to the step of selecting a tire or lift kit accessory:

displaying a base image or modified base image in the vehicle animation window.

8. The method of claim 7, further comprising prior to the step of retrieving a base image or modified base image:

generating a base image, the base image generated by:

generating a digital photograph of a basic vehicle;

storing the digital photograph in a raw image file; and converting the raw image file to a layered image file.

9. The method of claim 8 further comprising after the step of generating a base image:

generating a modified base image, the modified base image generated by manipulating the base image, wherein the modified base image has a different color or trim package than the base image.

10. The method of claim 9, wherein the base images and modified base images include a ¾ front view, a ¾ rear view, an interior view, or a combination thereof.

11. The method of claim 10 further comprising:

forming an overlay using a tire or lift kit accessory image using an image manipulation program to form an overlay.

12. The method of claim 11, wherein the step of animating the tire or lift kit accessory image onto the base image or modified base image comprises layering a first overlay onto the base image or modified base image to form an accessorized image.

13. The method of claim 1, wherein the tire or lift kit accessory is a tire accessory wherein the tire accessory is a tire with a larger diameter tire than that of the base image and wherein the first image layer is an exterior image layer.

14. The method of claim 1, wherein the tire or lift kit accessory is a lift kit accessory and wherein the first image layer is a lower exterior image layer or an underbody image layer and wherein the second image layer is a shadow image layer, a rims image layer, or a tires image layer.

15. The method of claim 1, wherein a ratio that the first image layer is raised relative to the second image layer in pixels corresponding to the number of inches the first part of the vehicle is raised relative to the second part of the vehicle is between 1 and 15 pixels per inch.

16. The method of claim 1, wherein tire or lift kit accessory is a lift kit accessory and wherein animating the accessory image onto the base image or modified base image exposes more of an underbody layer as compared to when the accessory image is not animated.

17. The method of claim 1, wherein both a tire accessory image and a lift kit accessory image are animated onto the base image or modified base image and wherein the distance the first image layer is raised relative to second image layer is correlated to the distance the tire accessory and lift kit accessory raises a first part of a vehicle corresponding to the first image layer relative to a second part of the vehicle corresponding to the second image layer.

* * * * *